United States Patent
Carpenter et al.

(10) Patent No.: US 9,493,930 B2
(45) Date of Patent: *Nov. 15, 2016

(54) LOCK FOR SECURING A WEAR ASSEMBLY TO EXCAVATING EQUIPMENT

(71) Applicant: ESCO Corporation, Portland, OR (US)

(72) Inventors: Christopher M. Carpenter, Tualatin, OR (US); Donald M. Conklin, Lake Oswego, OR (US); James E. Bearden, Beaverton, OR (US); Severn D. Durand, Portland, OR (US); Dziugas Radzius, Portland, OR (US)

(73) Assignee: ESCO Corporation, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/213,538

(22) Filed: Mar. 14, 2014

(65) Prior Publication Data

US 2014/0196324 A1 Jul. 17, 2014

Related U.S. Application Data

(62) Division of application No. 13/705,691, filed on Dec. 5, 2012, now Pat. No. 8,689,472, which is a division of application No. 13/369,699, filed on Feb. 9, 2012, now abandoned, which is a division of application (Continued)

(51) Int. Cl.
*E02F 9/28* (2006.01)
*B23P 11/00* (2006.01)

(52) U.S. Cl.
CPC .............. *E02F 9/2833* (2013.01); *B23P 11/00* (2013.01); *E02F 9/28* (2013.01); *E02F 9/2808* (2013.01);

(Continued)

(58) Field of Classification Search
CPC ....... E02F 9/28; E02F 9/2825; E02F 9/2833; E02F 9/2841; E02F 9/2866; E02F 9/2891; E02F 9/2883; E02F 9/2808; E02F 9/2875; B23P 11/00; Y10T 29/49826
USPC ................................ 37/446, 452–456, 449; 172/701.1–701.3; 403/150, 153, 297, 403/355; 299/109–113
See application file for complete search history.

(56) References Cited

U.S. PATENT DOCUMENTS

| 915,809 A | 3/1909 | Thomas |
| 1,375,638 A | 4/1921 | Kienzle |

(Continued)

FOREIGN PATENT DOCUMENTS

| AU | 542726 B2 | 3/1985 |
| AU | 573942 B2 | 6/1988 |

(Continued)

OTHER PUBLICATIONS

Hensley Australia J-Bolt Assembly Instructions (3 pgs)—No Date.

(Continued)

*Primary Examiner* — Robert Pezzuto
(74) *Attorney, Agent, or Firm* — Steven P. Schad

(57) ABSTRACT

A wear assembly for excavating equipment which includes a wear member and a base each with upper and lower stabilizing surfaces that are offset and at overlapping depths to reduce the overall depth of the assembly while maintaining high strength and a stable coupling. The nose and socket each includes a generally triangular-shaped front stabilizing end to provide a highly stable front connection between the nose and wear member for both vertical and side loading. The lock is movable between hold and release positions to accommodate replacing of the wear member when needed, and secured to the wear member for shipping and storage purposes.

12 Claims, 21 Drawing Sheets

Related U.S. Application Data

No. 13/005,791, filed on Jan. 13, 2011, now Pat. No. 8,122,621, which is a division of application No. 11/729,502, filed on Mar. 28, 2007, now Pat. No. 7,882,649.

(60) Provisional application No. 60/787,268, filed on Mar. 30, 2006.

(52) U.S. Cl.
CPC .......... *E02F 9/2825* (2013.01); *E02F 9/2841* (2013.01); *E02F 9/2866* (2013.01); *E02F 9/2875* (2013.01); *E02F 9/2883* (2013.01); *E02F 9/2891* (2013.01); *Y10T 29/49826* (2015.01)

(56) References Cited

U.S. PATENT DOCUMENTS

| | | |
|---|---|---|
| 1,834,391 A | 12/1931 | Edmunds |
| 2,305,653 A | 12/1942 | Ward |
| 2,397,521 A | 4/1946 | Askue |
| 2,450,044 A | 9/1948 | Hobbs |
| 2,490,532 A | 12/1949 | Maxon, Jr. |
| 2,688,475 A | 9/1954 | Small |
| 2,807,105 A | 9/1957 | Launder |
| 2,870,552 A | 1/1959 | Richardson |
| 2,885,801 A | 5/1959 | Hill |
| 3,079,710 A | 3/1963 | Larsen et al. |
| 3,117,386 A | 1/1964 | Ferwerda |
| 3,175,314 A | 3/1965 | Williamson |
| 3,196,956 A | 7/1965 | Ratkowski |
| 3,197,894 A | 8/1965 | Ratkowski |
| 3,225,467 A | 12/1965 | Troeppl |
| 3,292,281 A | 12/1966 | Petersen |
| 3,330,601 A | 7/1967 | Proctor |
| 3,334,431 A | 8/1967 | Phillips |
| 3,397,012 A | 8/1968 | Krekeler |
| 3,453,756 A | 7/1969 | Schroeder |
| 3,469,332 A | 9/1969 | Leffingwell |
| 3,624,827 A | 11/1971 | Liess |
| 3,675,350 A | 7/1972 | Mulcahy et al. |
| 3,760,654 A | 9/1973 | Fisher |
| 3,767,266 A | 10/1973 | Krekeler |
| 3,864,854 A | 2/1975 | Evans |
| 3,865,437 A | 2/1975 | Crosby |
| 4,067,657 A | 1/1978 | Kaarlela |
| 4,210,374 A | 7/1980 | Churla |
| 4,231,173 A | 11/1980 | Davis |
| 4,320,924 A | 3/1982 | Langfield et al. |
| 4,367,602 A | 1/1983 | Petersen |
| 4,404,760 A | 9/1983 | Hahn et al. |
| 4,501,079 A | 2/1985 | Hahn et al. |
| 4,505,058 A | 3/1985 | Petersen |
| 4,599,860 A | 7/1986 | Parsons |
| 4,611,418 A | 9/1986 | Launder |
| 4,716,666 A | 1/1988 | Potter |
| 4,747,495 A | 5/1988 | Hoss |
| 4,748,754 A | 6/1988 | Schwappach |
| 4,751,785 A | 6/1988 | Johansson et al. |
| 4,831,346 A | 5/1989 | Brooker et al. |
| 4,848,013 A | 7/1989 | Bowman et al. |
| 4,881,331 A | 11/1989 | Paizes |
| 5,009,017 A | 4/1991 | Diekevers et al. |
| 5,088,214 A | 2/1992 | Jones |
| 5,177,886 A | 1/1993 | Klett |
| 5,210,965 A | 5/1993 | Funk, Sr. et al. |
| 5,241,765 A | 9/1993 | Jones et al. |
| 5,423,138 A | 6/1995 | Livesay et al. |
| 5,465,512 A | 11/1995 | Livesay et al. |
| 5,553,866 A | 9/1996 | Heinzen |
| 5,561,925 A | 10/1996 | Livesay |
| 5,596,908 A | 1/1997 | Hall |
| 5,666,748 A | 9/1997 | Emrich et al. |
| 5,709,043 A | 1/1998 | Jones et al. |
| 5,713,145 A | 2/1998 | Ruvang |
| 5,806,216 A | 9/1998 | Renski |
| 5,913,605 A | 6/1999 | Jusselin et al. |
| 5,918,391 A | 7/1999 | Vinas Peya |
| 6,030,143 A | 2/2000 | Kreitzberg |
| 6,047,487 A | 4/2000 | Clendenning |
| 6,053,280 A | 4/2000 | Smith et al. |
| 6,079,132 A | 6/2000 | Clendenning |
| 6,085,448 A | 7/2000 | Gale et al. |
| 6,108,950 A | 8/2000 | Ruvang et al. |
| 6,119,378 A | 9/2000 | Pippins |
| D435,567 S | 12/2000 | Clendenning |
| 6,230,676 B1 | 5/2001 | Pryba et al. |
| 6,240,663 B1 | 6/2001 | Robinson |
| 6,247,255 B1 | 6/2001 | Clendenning |
| D446,224 S | 8/2001 | Clendenning |
| D447,154 S | 8/2001 | Clendenning |
| 6,321,471 B2 | 11/2001 | Fernandez Munoz |
| H2020 H | 5/2002 | Kesavan et al. |
| 6,385,871 B1 | 5/2002 | Quarfordt |
| 6,393,739 B1 | 5/2002 | Shamblin et al. |
| 6,406,236 B1 | 6/2002 | Olson, Jr. |
| 6,430,851 B1 | 8/2002 | Clendenning |
| 6,477,796 B1 | 11/2002 | Cornelius |
| 6,491,469 B1 | 12/2002 | Pasqualini et al. |
| 6,565,146 B2 | 5/2003 | Fujan et al. |
| 6,708,431 B2 | 3/2004 | Robinson et al. |
| 6,735,890 B2 | 5/2004 | Carpenter et al. |
| 6,836,983 B2 | 1/2005 | Pallas Moreno et al. |
| 6,839,990 B2 | 1/2005 | Leslie et al. |
| 6,865,282 B2 | 3/2005 | Weisman |
| 6,865,828 B1 | 3/2005 | Molino et al. |
| 6,871,426 B2 | 3/2005 | Keech et al. |
| 6,886,893 B1 | 5/2005 | Fisch et al. |
| 6,938,961 B2 | 9/2005 | Broom |
| 6,959,506 B2 | 11/2005 | Adamic et al. |
| 7,032,334 B2 | 4/2006 | Pippins |
| D527,029 S | 8/2006 | Launder et al. |
| 7,100,315 B2 | 9/2006 | Carpenter |
| 7,162,818 B2 | 1/2007 | Ruvang et al. |
| 7,168,193 B2 | 1/2007 | Pallas Moreno |
| 7,171,771 B2 | 2/2007 | Briscoe |
| 7,174,661 B2 | 2/2007 | Briscoe |
| 7,178,274 B2 | 2/2007 | Emrich |
| 7,367,144 B2 | 5/2008 | Jones et al. |
| 7,640,684 B2 | 1/2010 | Adamic et al. |
| 7,640,685 B2 | 1/2010 | Emrich |
| 7,762,015 B2 | 7/2010 | Smith et al. |
| 7,882,649 B2 | 2/2011 | Carpenter et al. |
| 8,122,621 B2 | 2/2012 | Carpenter et al. |
| RE43,693 E | 10/2012 | Emrich |
| 8,689,472 B2 | 4/2014 | Carpenter et al. |
| 2002/0000053 A1 | 1/2002 | Adamic et al. |
| 2003/0024139 A1 | 2/2003 | Jones et al. |
| 2004/0010949 A1 | 1/2004 | Laguarda et al. |
| 2004/0037637 A1 | 2/2004 | Lian et al. |
| 2004/0107608 A1 | 6/2004 | Meyers et al. |
| 2005/0173203 A1 | 8/2005 | Buckner |
| 2005/0229442 A1 | 10/2005 | Jones et al. |
| 2005/0274047 A1 | 12/2005 | Pippins |
| 2008/0256832 A1 | 10/2008 | Esti |

FOREIGN PATENT DOCUMENTS

| | | |
|---|---|---|
| AU | 642377 B2 | 10/1993 |
| AU | 199712864 | 2/2000 |
| AU | 199965315 | 4/2000 |
| AU | 766917 B2 | 10/2003 |
| AU | 200154094 | 10/2003 |
| AU | 2003265731 A1 | 4/2004 |
| AU | 2003264586 A1 | 7/2004 |
| AU | 2003285638 A1 | 7/2004 |
| AU | 2007218013 | 8/2007 |
| AU | 2007241122 A1 | 11/2007 |
| AU | 2011201135 A1 | 4/2011 |
| AU | 2013200095 B2 | 10/2014 |
| CA | 907661 A | 8/1972 |
| CA | 2076019 A1 | 7/1992 |
| CA | 2305617 A1 | 5/1999 |
| CA | 2520002 A1 | 11/2004 |

(56) References Cited

FOREIGN PATENT DOCUMENTS

| | | |
|---|---|---|
| DE | 2052149 A1 | 11/1971 |
| DE | 3720855 C1 | 2/1988 |
| DE | 3720924 A1 | 1/1989 |
| DE | 4345100 | 7/1995 |
| EP | 1174547 A1 | 1/2002 |
| FR | 2032575 A5 | 11/1970 |
| FR | 2082069 A6 | 12/1971 |
| FR | 2298650 A1 | 8/1976 |
| GB | 678382 A | 9/1952 |
| GB | 1215839 A | 12/1970 |
| GB | 1263030 A | 2/1972 |
| GB | 1410814 A | 10/1975 |
| GB | 1557152 | 12/1979 |
| GB | 2118616 A | 11/1983 |
| GB | 2143801 A | 2/1985 |
| JP | 53 137501 | 12/1978 |
| JP | S55 013265 U | 1/1980 |
| JP | 2-23062 | 2/1990 |
| JP | 06026070 | 2/1994 |
| JP | 10 252106 | 9/1998 |
| JP | 11 107329 | 4/1999 |
| WO | WO 97/21880 | 6/1997 |
| WO | WO99/23316 | 5/1999 |
| WO | WO2004/057117 | 7/2004 |
| WO | 2005056934 A1 | 6/2005 |
| WO | WO2005/080695 | 9/2005 |
| WO | WO2007 060697 | 5/2007 |
| WO | 2007123653 A2 | 11/2007 |
| WO | 2007127288 A2 | 11/2007 |

OTHER PUBLICATIONS

J-Bolt Lip Shrod Installation, LS200-350J, LS200-1350JL, LS200-1350JR Dated Oct. 21, 1997 (1 pg).
PAC Mining Pty Ltd. Part No. M6521, 1 1/2" T Bolt Kit (1 pg)—No Date.
PAC Mining Pty Ltd Part No. M6292, 1 1/4" T Bolt Kit (1 pg)—No Date.
AU2011201135 Evidence in Support—Statutory Declaration filed by CQMS (210 pgs).
AU2011201135 Evidence in Support—Statutory Declaration filed by CAT—Brett Gary Connor (166 pgs).
AU2011201135 Evidence in Support—Statutory Declaration filed by CAT—Bruce Alexander Leslie (11 pgs).
AU2011201135 Evidence in Support—Statutory Declaration filed by CAT—Bruce Alexander Leslie (106 pgs).
AU2011201135 Evidence in Support—Statutory Declaration filed by ESCO—Howard Robinson 1st Declaration (6 pgs).
AU2011201135 Evidence in Support—Statutory Declaration filed by ESCO—Howard Robinson 2st Declaration (5 pgs).
130524 Plaintiffs (ESCO's) Initial Dislcosure of Asserted Claims and Infringement Contentions to All Defendants in a lawsuit related to U.S. Pat. No. 8,122,621 (15 pgs).
130524 Plaintiffs (ESCO's) Initial Dislcosure of Asserted Claims and Infringement Contentions to All Defendants in a lawsuit related to U.S. Pat. No. 8,122,621 Exhibit A (78 pgs).
130722Defendants Initial Disclosure of NonInfringement, Invalidity, and Unenforceability Contentions Pusuant to L.R. 16.1-8 in lawsuit related to U.S. Pat. No. 8,122,621 (27 pgs).
130722 Def. Initial Disc. of NonInfringement, Invalidity, and Unenforceability Contentions Pusuant to L.R. 16.1-8 in lawsuit related to U.S. Pat. No. 8,122,621 Exhibit C (1 pg).
131101 The ESCO Parties' LR 16.1-10 Response to Defendants' LR 16.1-8 Contentions in a lawsuit related to U.S. Pat. No. 8,122,621 (34 pgs).
131101 The ESCO Parties' LR 16.1-10 Response to Defendants' LR 16.1-8 Contentions in a lawsuit related to U.S. Pat. No. 8,122,621 Exhibit A1 (20 pgs).
131101 The ESCO Parties' LR 16.1-10 Response to Defendants' LR 16.1-8 Contentions in a lawsuit related to U.S. Pat. No. 8,122,621 Exhibit B2 (119 pgs).
120829 Complaint for Patent Infringment and Demand for Jury Trial in a lawsuit related to U.S. Pat. No. 8,122,621 (139 pgs).
121005 First Amended Complaint for Patent Infringement and Demand for Jury Trial in a lawsuit related to U.S. Pat. No. 8,122,621 (12 pgs).
131202 Defendants (CAT, and Cashman Equipment Company's) Answer to Plaintiffs (ESCO's) Couterclaims in a lawsuit related to U.S. Pat. No. 8,122,621 (11 pgs).
130913 Defendants (Raptor) Answer and Couterclaims in a lawsuit related to U.S. Pat. No. 8,122,621 (32 pgs).
131107 Plantiffs (ESCO's) Answer and Couterclaims to Defendants (CAT, and Cashman Equipment Company's) Couterclaims in a lawsuit related to U.S. Pat. No. 8,122,621 (40 pgs).
131107 Plantiffs (ESCO's) Answer to Defendants (Raptor's) Couterclaims in a lawsuit related to U.S. Pat. No. 8,122,621 (10 pgs).
131107 ESCO's Motion to Dismiss Defendants' Couterclaims and strike Affirmitive Defenses in a lawsuit related to U.S. Pat. No. 8,122,621 (45 pgs).
131125 Defendants'/Counterclaimants' Opposition to the ESCO Parties' Motion to Dismiss and Motion to Strike in a lawsuit related to U.S. Pat. No. 8,122,621 (38 pgs).
131209ESCO's Motion for Leave to File a Rep. Brief in Support of Its Motion to Dismiss Def. Count. & Strike Affirmative Defenses in lawsuit related to U.S. Pat. No. 8,122,621 (20 pgs).
131125Motion to Join Co-Def. Opp. to Plaint. Motion to Strike Inequitable Conduct and Unclean Hands/Patent Misuse Affirmative Def. in lawsuit related to U.S. Pat. No. 8,122,621 (3 pgs).
131209Stip.&Ord. to W/D Inequitable Conduct & Unclean Hands/Patent Misuse Aff. Def. W/O Prejudice&To W/D Motion to Strike the Same in lawsuit related to U.S. Pat. No. 8,122,621 (5 pgs).
AU2011201135 Evidence in Support—Statutory Declaration filed by ESCO—Howard Robinson 3rd Declaration (9 pgs).
AU2007241122 Statement of Grounds and Particulars of Opposition filed by CQMS (11 pgs).
AU2007241122 Evidence in Support—Statutory Declaration #1 filed by CQMS (459 pgs).
AU2007241122 Evidence in Support—Statutory Declaration #2 filed by CQMS (97 pgs).
AU2011201135 Statement of Grounds and Particulars of Opposition filed by CAT (7 pgs).
AU2011201135 Statement of Grounds and Particulars of Opposition filed by CQMS (10 pgs).
AU2011201135 Statement of Gounds and Particulars of Opposition filed by Ronneby Road (3 pgs).
AU2011201135 Evidence in Support—Statutory Declaration #1 filed by Ronneby Road (19 pgs).
AU2011201135 Evidence in Support—Statutory Declaration #2 filed by Ronneby Road titled BH-1 (6 pgs).
AU2011201135 Evidence in Support—The Edge Solutions from ESCO Aug. 2007 #3 filed by Ronneby Road (32 pgs).
Statement of Commercial Use of Torqlok Tooth System with Drawings (4 pgs).
130722Def. Initial Disc. of NonInfringement, Invalidity, and Unenforceability Contentions Pusuant to L.R. 16.1-8 in lawsuit related to U.S. Pat. No. 8,122,621 Exhibit D (290 pages).
130722Def. Initial Disc. of NonInfringement, Invalidity, and Unenforceability Contentions Pusuant to L.R. 16.1-8 in lawsuit related to U.S. Pat. No. 8,122,621 Exhibit E (7 pages).
2013 200095—CQMS—Statement of grounds filed Oct. 23, 2015 (amended) (11 pages).
2013 202342—Caterpillar—Evidence—Declaration of Bruce Leslie dated Aug. 6, 2014 (103 pages).
2013 202342—Caterpillar—Evidence—Declaration of Bruce Leslie dated Jul. 31, 2014 (66 pages).
2013 202342—Caterpillar—Evidence—Declaration of Daneta Crump dated Aug. 7, 2014 (154 pages).
2013 202342—Caterpillar—Statement of Opposition dated Jun. 13, 2014 (3 pages).
2013 202355—Caterpillar—Evidence—Declaration of H Holland dated Sep. 26, 2015 (10 pages).
2013 202355—Caterpillar—Evidence—Declaration of Jonathan Schnapp dated Jul. 1, 2015 (1 page).

(56) References Cited

OTHER PUBLICATIONS 2013 202355—Caterpillar—Statement of Opposition (amended) dated Jul. 6, 2015 (131 pages).
2013 202355—Caterpillar—Statement of Opposition dated Apr. 2, 2015 (8 pages).
2013 202351—Caterpillar—s27 Notice and Attachments dated 09/01/5 (220 pages).
2013 202355—Caterpillar—Evidence—Declaration of Bruce Leslie dated Jul. 1, 2015 (18 pages).
2013 202355—Caterpillar—Evidence—Declaration of Bruce Leslie dated Jul. 2, 2015 (1 page).
2013 202355—Caterpillar—Evidence—Declaration of Bruce Leslie dated Jun. 5, 2015 (14 pages).
2013 202355—Caterpillar—Evidence—Declaration of Bruce Leslie dated Oct. 12, 2015 (35 pages).
2013 202355—Caterpillar—Evidence—Declaration of H Holland dated Oct. 5, 2015 (53 pages).
QSF SimplexE System (29 pages).
QSF Ground Engaging Tools & Rigging 2004 (21 pages).
Esco Patent Owner's Notice of Disclaimer—Case IPR2015-00409 for U.S. Pat. No. 8,689,472 dated Sep. 11, 2015 (4 pages).
Esco's Disclaimer Claim 14 for U.S. Pat. No. 8,689,472 filed Sep. 16, 2015 (1 page).
Reply in Support of Motion for Reconsideration dated Jul. 27, 2015 (25 pages).
ESCO's Motion to Dismiss Defendants' Counterclaims Strike Affirmative Defenses Re to Inequitable Conduct dated May 13, 2015 (143 pages).
ESCO's Reply in Support of Its Motion to Dismiss Defendants' Counterclaims & Strike Affirmative Defenses Re to Inequitable Conduct; & Sever & Stay Remaining Counterclaims & Affirmative Defenses Re to Antitrust & Misuse dated Jul. 16, 2015 (274 pages).
Defendants' Opposition to ESCO's Motion for Limited Reconsideration of the Court's Claim Construction Order dated Jul. 8, 2015 (24 pages).
Caterpillar's Request for Rehearing (Paper 12) dated Jul. 2, 2015 (20 pages).
Caterpillar's Reply to ESCO's Opposition to Request for Rehearing (Paper 14) dated Jul. 16, 2015 (8 pages).
ESCO's Opposition to Request for Rehearing (Paper 13) dated Jul. 13, 2015 (19 pages).
ESCO's Preliminary Response to Petition for Inter Partes Review (Paper 6) dated Jul. 17, 2015 (71 pages).
Paper 12—Decision Instituting Inter Partes Review 35 U S C Sec 314 37 C F R Secs 42 4 42 108 dated Oct. 15, 2015 (27 pages).
ESCO's Motion for Limited Reconsideration of the Court's Claim Construction Order dated Jun. 9, 2015 (37 pages).
Memorandum of Points Authorities in Opposition to ESCO's Motion to Dismiss Defendants' Counterclaim dated Jun. 22, 2015 (193 pages).
Judgment and Final Written Decision (Paper 20) (IPR2015-00409) dated Sep. 23, 2015 (4 pages).
Paper No. 18—Order Conduct of the Proceeding dated Sep. 15, 2015 (4 pages).
Decision Denying Request for Rehearing dated Aug. 31, 2015 (11 pages).
Paper No. 10—Order Conduct of the Proceeding dated Sep. 15, 2015 (4 pages).
Corrected Preliminary Response (Paper 9) dated Aug. 12, 2015 (71 pages).
Order Granting ESCO's Motion for Corrected Preliminary Response (Paper 8) dated Aug. 11, 2015 (4 pages).
Exhibits to Esco's Preliminary Response to Petition for Inter Partes Review dated Sep. 17, 2015 (508 pages).
CAT's Memorandum of Points and Authorities in Opposition to Plaintiffs' Motion to Dismiss dated Jun. 22, 2015 (193 pages).
Decision of Institution of Inter Partes Review for U.S. Pat. No. 8,689,472 dated Jun. 18, 2015 (25 pages).
Decision of the Delegate of the Commissioner of Patents in the patent opposition for ESCO's Australian Patent Application No. 2011201135 dated Feb. 5, 2015 (26 pages).
Defendant's Caterpillar Glod Mining LLC's, Caterpillar Inc.'s, and Cashman Equipment Company's Answer and Counterclaims dated Jan. 30, 2015 (19 pages).
Defendant's Initial Disclosures on Non-Infringement, Invalidity and Unenforceabality dated Sep. 8, 2014 (334 pages).
Defendant's Motion to Dismiss as Moot Esco's Motion to Dismiss Defendants' Counterlciams and Strike Affirmative Defensens and Extend the Deadline to Answer the Complaint Originally Filed in the -00529 case Until Such Time as the Parties Agree to a Sitpulated Schedule dated Jan. 21, 2015 (6 pages).
Defendants' Opening Claim Construction Brief dated Mar. 7, 2015 (264 pages).
Defendants' Preliminary Identification of Proposed Claim Constructions and Supporting Intrinsic and Extrinsic Evidence dated Nov. 4, 2014 (60 pages).
Defendants' Responsive Claim Construction Brief dated Apr. 24, 2015 (238 Pages).
Amended and Consolidated Complaint for Patent Infringement and Demand for Jury Trial dated Mar. 2, 2015 (183 pages).
Complaint for Patent Infringement and Demand for Jury Trial dated Apr. 7, 2014 (6 pages).
Plaintiff ESCO Corporation Initial Disclosure of Asserted Claims and Infringement Contentions to all Defendants dated Jul. 24, 2014 (97 pages).
ESCO's LR 16.1-14 Preliminary Proposed Claim Constructions and Identification of Supporting Intrinsic and Extrinsic Evidence dated Nov. 4, 2014(12 Pages).
Plaintiff ESCO Corporation's LR 16.1-10 Response to Defendants' LR 16.1-8 Contentions dated Sep. 22, 2014 (176 pages).
Petition for Inter Parties Review of U.S. Pat. No. 8,689,472 (No. IPR2015-01032) dated Apr. 17, 2015 (65 pages).
Exhibit 1002 to CAT's petition for IPR—Declaration of Lee A. Horton, P.E. dated Apr. 17, 2015 (131 pages).
Exhibit 1008 to CAT's petition for IPR—US District Court Nevada (Las Vegas) Civil Docket for Case #: 2:14-cv-00529-RCJ-PAL (*ESCO Corp* v. *Cashman Equipment Co. et al*. dated Apr. 17, 2015 (12 pages).
Exhibit 1011 to CAT's petition for IPR—(*ESCO* v. *Cashman*)—Defendants' Prel Indentification of Proposed claim Constructions and Supporting Intrinsic and Extrinsic Evidence dated Apr. 17, 2015 (60 pages).
Exhibit 1012 to CAT's petition for IPR—(*ESCO* v. *Cashman*)—ESCO's LR 16.1-14 Prel Proposed Claim Constructions and Identification of Supporting Intrinsic and Extrinsic Evidence dated Apr. 17, 2015 (12 pages).
Exhibit 1013 to CAT's petition for IPR—Defendants' Opening Claim Construction Brief dated Apr. 17, 2015 (86 pages).
Exhibit 1014 to CAT's petition for IPR—Cat Petition for IPR—USPTO IPR2015-00409, U.S. Pat. No. 8,689,472 dated Apr. 17, 2015 (66 pages).
The Esco Parties' Responsive Claim Construction Brief dated Apr. 24, 2015 (303 pages).
The Esco Parties' Opening Brief on Claim Construction dated Mar. 27, 2015 (246 pages).
Raptor's Answer to Complaint for Patent Infringement; Counterclaim; and Jury Demand filed Jan. 30, 2015 (18 pages).
Plaintiffs' Opposition to Defendants' Motion to Dismiss as Moot ESCO's Motion to Dismiss Defendants' Counterclaims and Strike Affirmative Defenses . . . dated Feb. 6, 2015 (10 pages).
Order [consolidating cases] published Dec. 30, 2014 (10 pages).
2007241122—CQMC—Decision of IP Ausrtralia dated Oct. 24, 2014 (18 pages).
2007 241122—CQMS—Patent Applicant Summary of Oral Submissions—Annexures (5 pages).
2007 241122—CQMS—Patent Applicant Summary of Oral Submissions dated Sep. 2, 2014 (45 pages).
2007 241122—CQMS—Submissions by the Opponent dated Aug. 26, 2014 (34 pages).
2011 201135—CQMS—Patentee submissions dated Oct. 29, 2014 (20 pages).

(56) References Cited

OTHER PUBLICATIONS 2011 201135—Decision of IP Australia dated Feb. 5, 2015 (26 pages).
2011 201135—Ronneby Road—Amended Notice of Appeal filed Sep. 30, 2015 (8 pages).
2011 201135—Ronneby Road—Evidence—Affidavit of Benjamin Hughes dated Jul. 3, 2015 (71 pages).
2011 201135—Ronneby Road—Evidence—Affidavit of Desmond Erickson dated Jul. 1, 2015 (17 pages).
2013 200107—Caterpillar—s27 Notice and attachments dated Sep. 1, 2015 (162 pages).
2011 201135—Ronneby Road—Evidence—Affidavit of Howard Robinson dated Jul. 3, 2015 (14 pages).
2011 201135—Ronneby Road—Evidence—Affidavit of Robynne Sanders dated Jul. 3, 2015 (3 pagpes).
2011 201135—Ronneby Road—Evidence—Affidavit of William Hunter dated Jul. 3, 2015 (87 pages).
2011 201135—Ronneby Road—Evidence—Affidavit of William Hunter dated Oct. 21, 2015 (17 pages).
2011 201135—Ronneby Road—Notice of Appeal dated Feb. 26, 2015 (6 pages).
2011 201135—Ronneby Road—Patent Applicant submissions dated Oct. 29, 2014 (45 pages).
2011 201135—Ronneby Road—Submissions dated Oct. 20, 2014 (23 pages).
2013 200095—Caterpillar—Amended statement of grounds filed Oct. 29, 2015 (8 pages).
2013 200095—Caterpillar—Evidence—Declaration of Bruce Leslie dated Jun. 5, 2015 (14 pages).
2013 200095—Caterpillar—Evidence—Declaration of Bruce Leslie dated Aug. 27, 2015 (16 pages).
2013 200095—Caterpillar—Evidence—Declaration of Jonathan Schnapp dated Oct. 15, 2015 (1 page).
2013 200095—Caterpillar—Statement of grounds filed Apr. 2, 2015 (10 pages).
2013 200095—CQMS—Evidence—Declaration of John De Wit dated Oct. 21, 2015 (5 pages).
2013 200095—CQMS—Statement of grounds filed Mar. 23, 2015 (10 pages).
VID83/2015—*Ronneby Road Pty Ltd* v *ESCO Corporation*; Affidavit of Howard William Robinson dated Nov. 11, 2015.
VID83/2015—*Ronneby Road Pty Ltd* v *ESCO Corporation*; Applicants Outline of Opening Submissions.
VID83/2015—*Ronneby Road Pty Ltd* v *ESCO Corporation*; ESCO Closing Submissions—Feb. 26, 2016.
VID83/2015—*Ronneby Road Pty Ltd* v *ESCO Corporation*; Respondents Outline of Opening Submissions.
VID83/2015—*Ronneby Road Pty Ltd* v *ESCO Corporation*; Ronneby Closing Submissions 1 (Claim Construction).
VID83/2015—*Ronneby Road Pty Ltd* v *ESCO Corporation*; Ronneby Closing Submissions 2 (Prior Use).
IPR 2015-01032—*Caterpillar Inc.* v. *ESCO Corporation*; Petitioners Reply.
IPR 2015-01032—*Caterpillar Inc.* v. *ESCO Corporation*; Judgment—Termination of the Proceedings, Jun. 20, 2016.

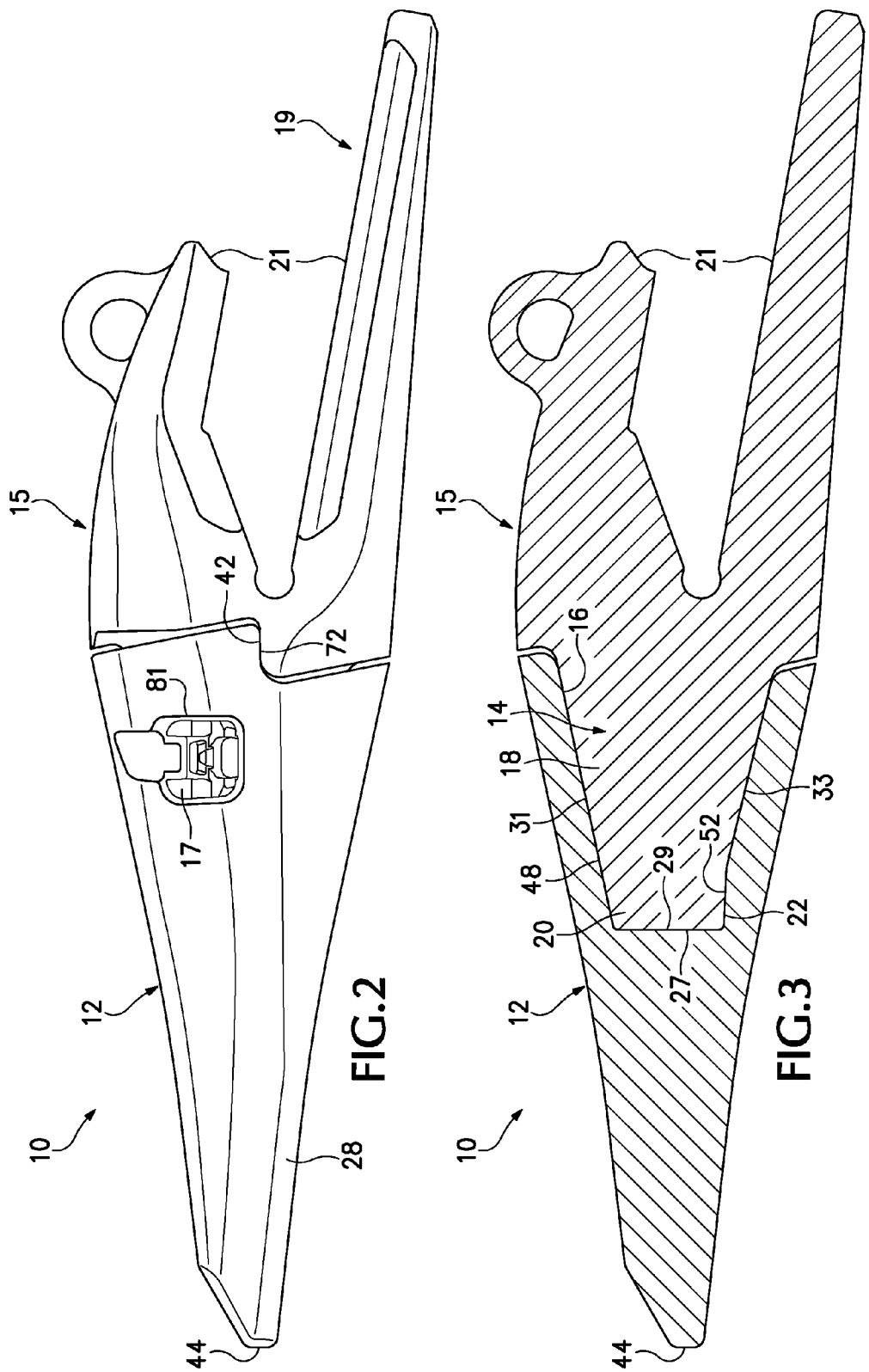

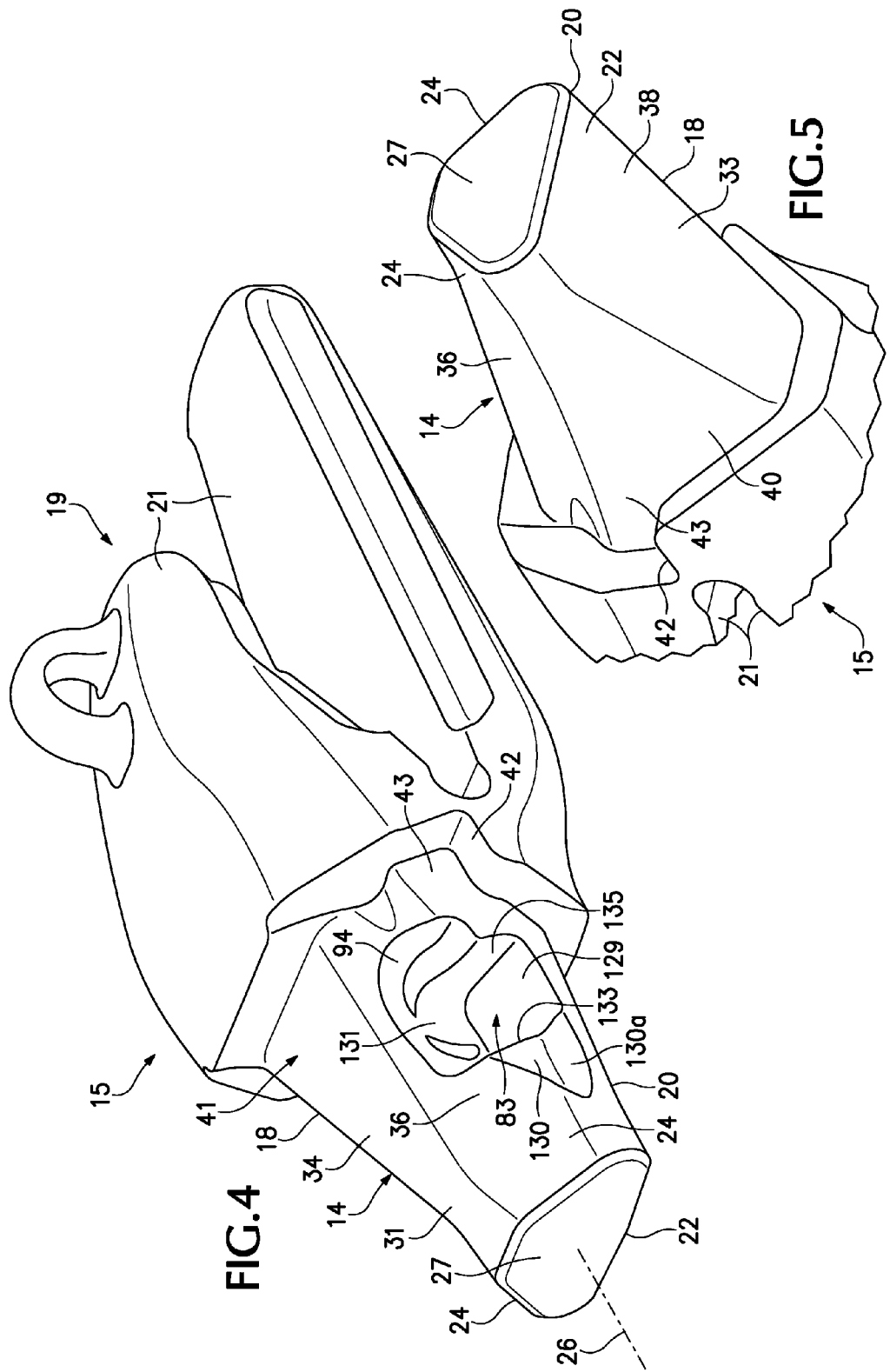

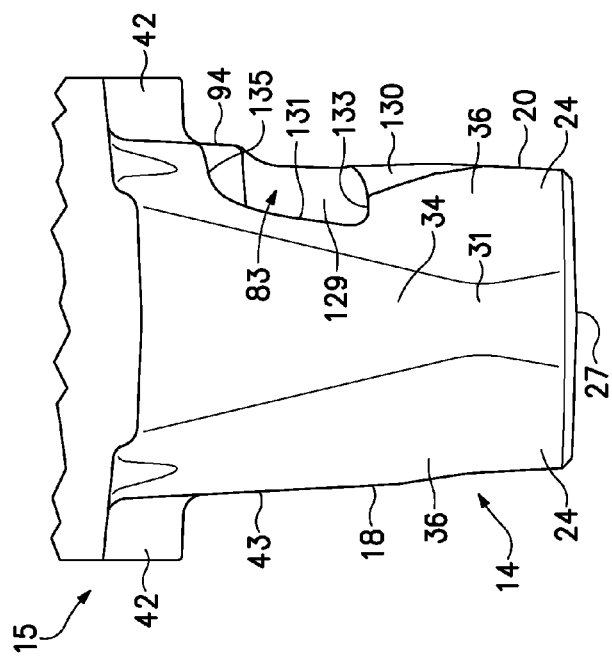
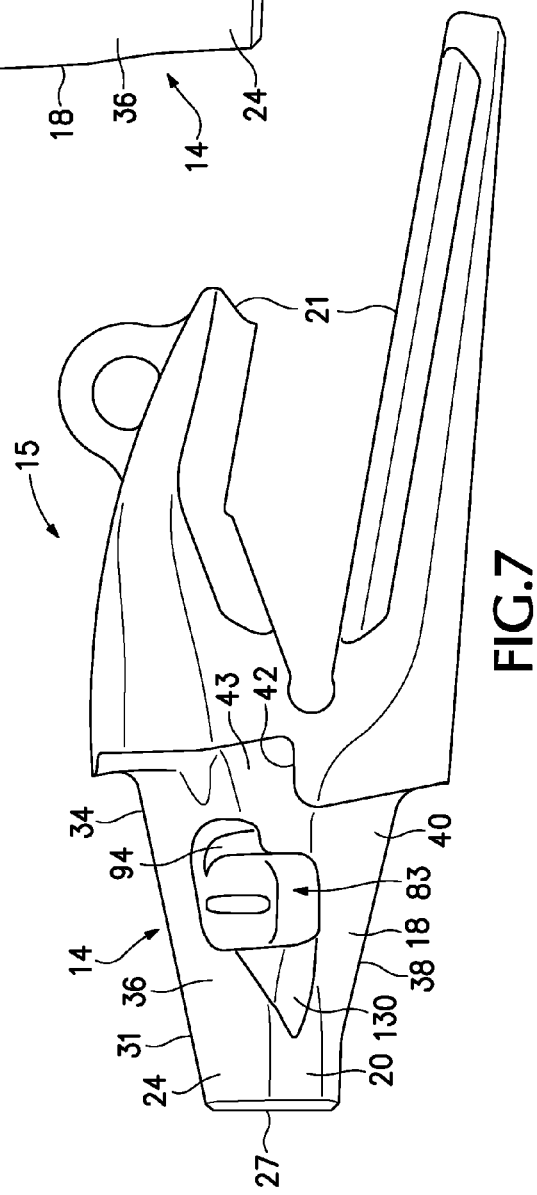

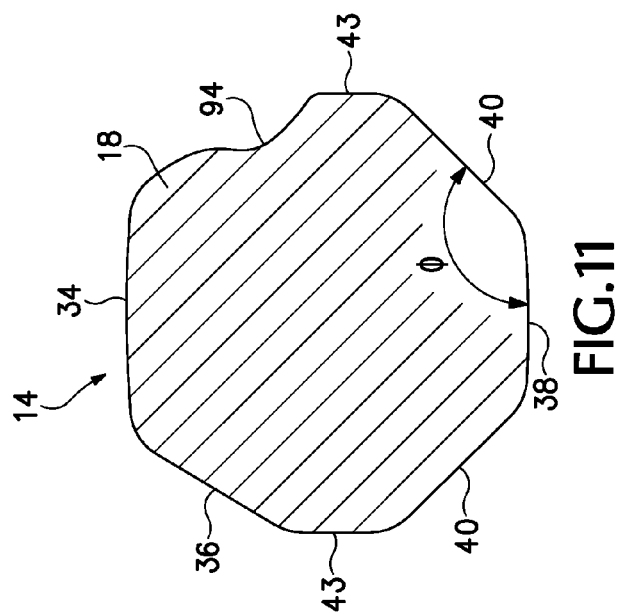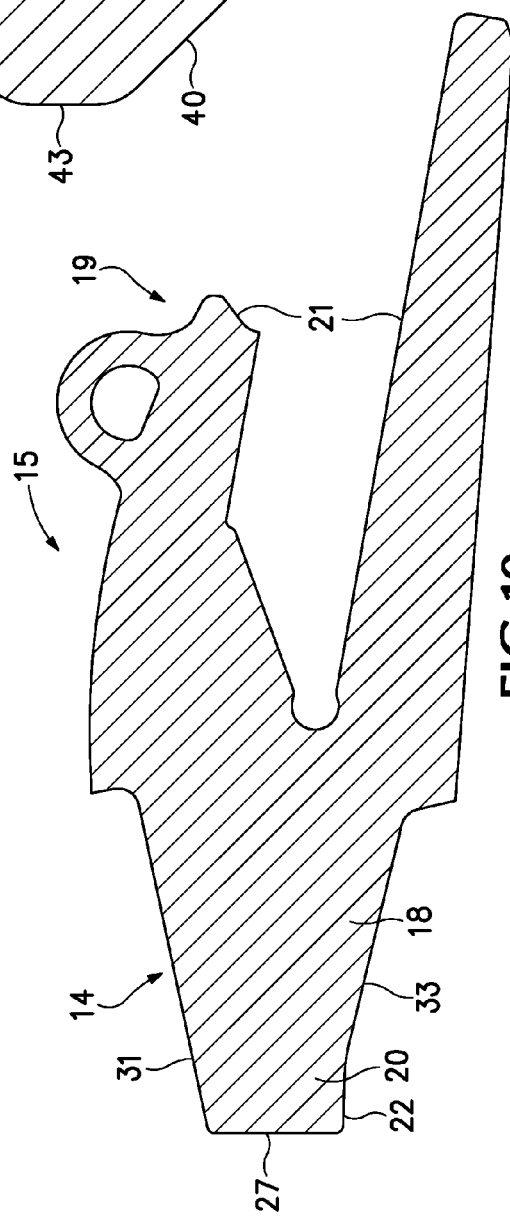

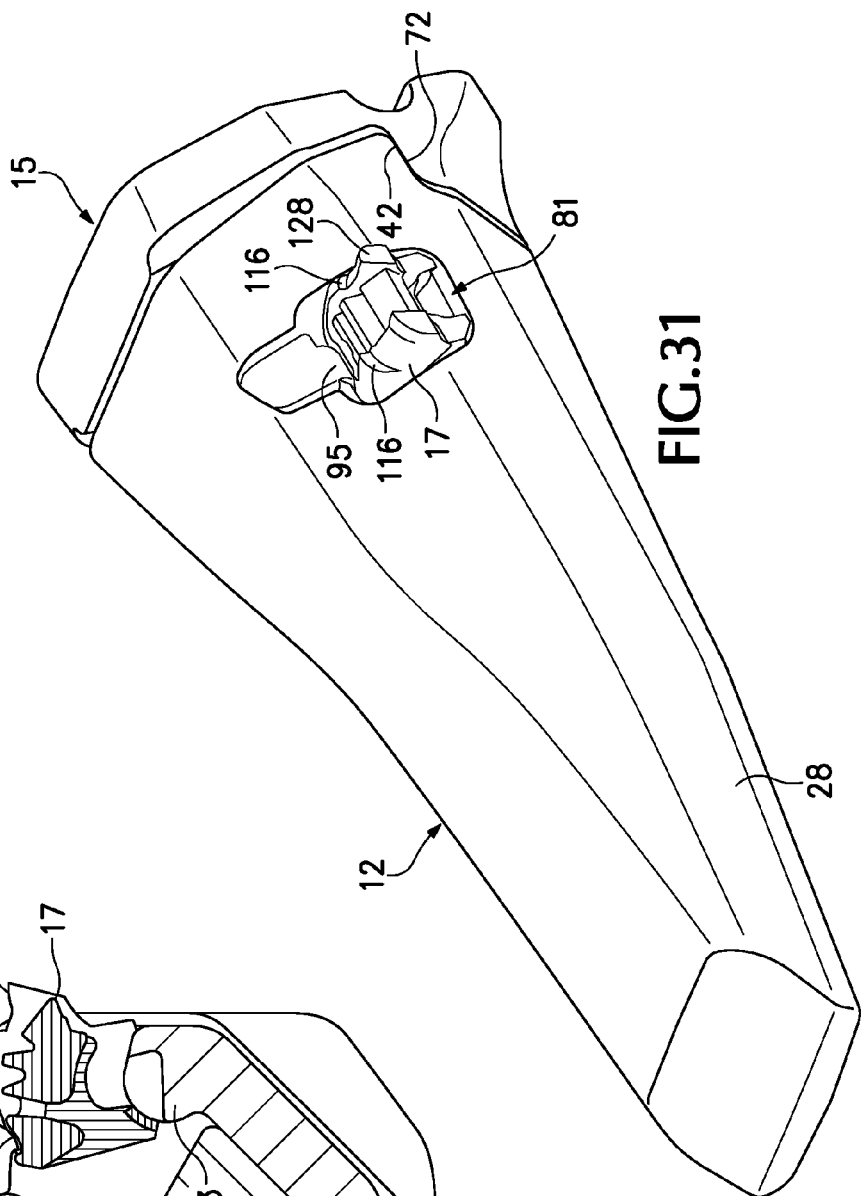
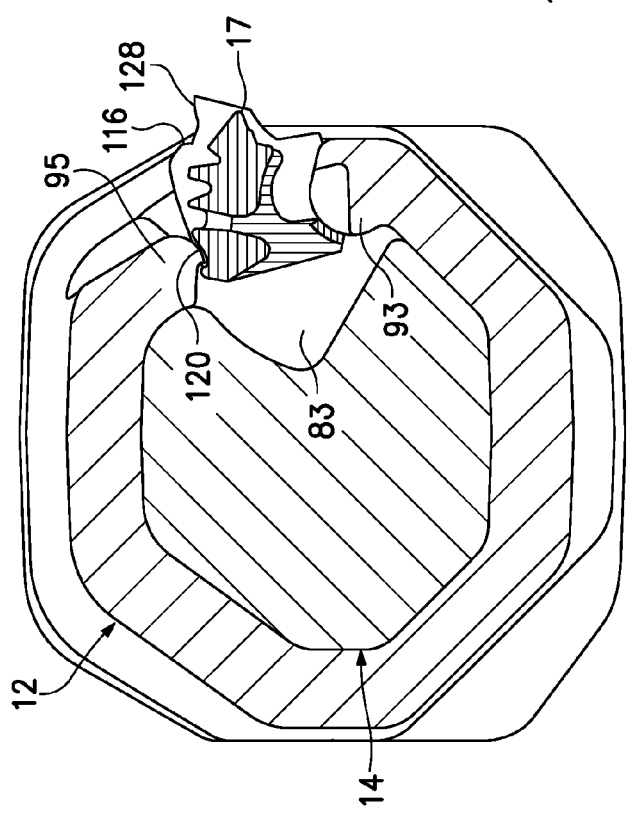

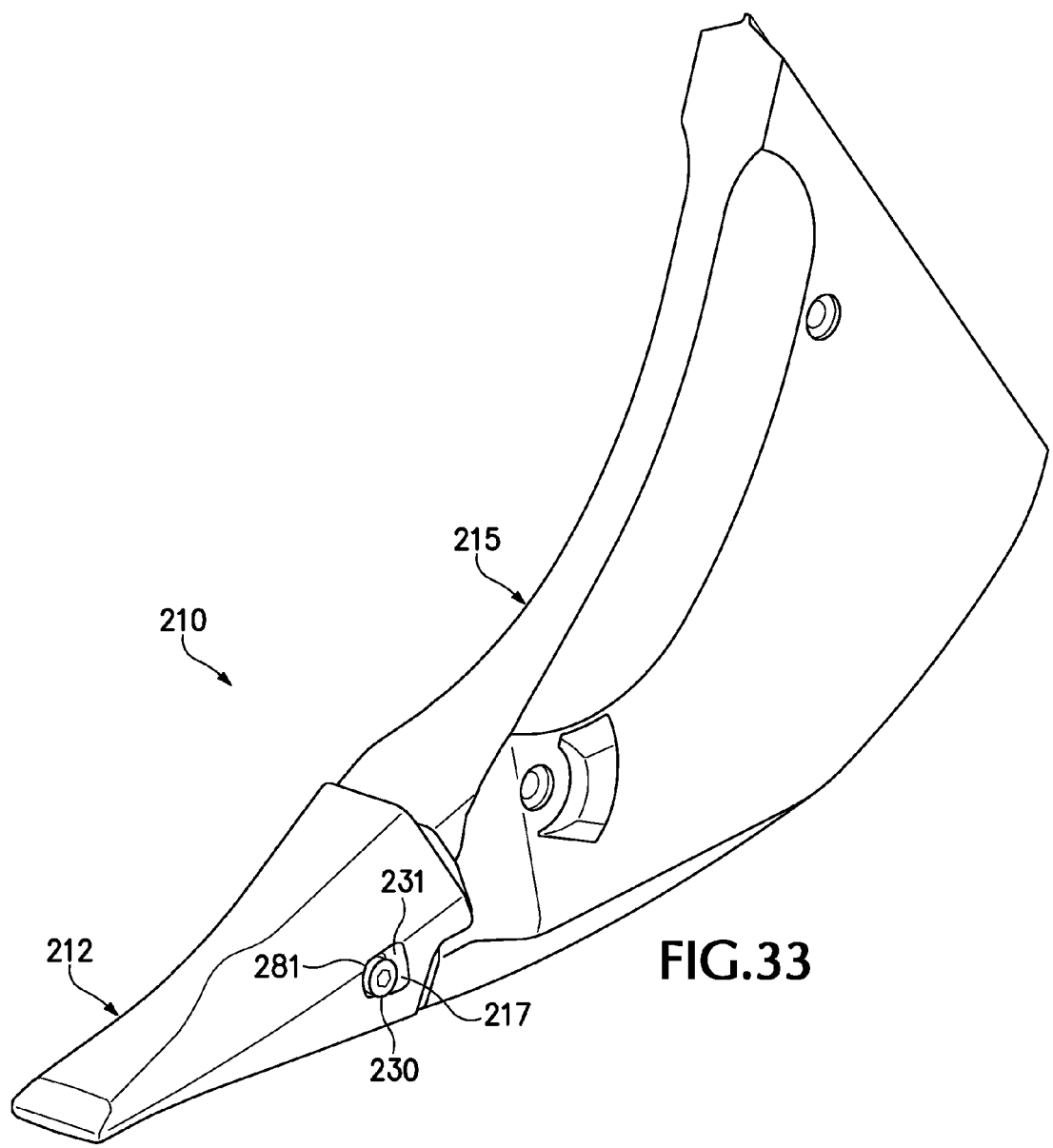

LOCK FOR SECURING A WEAR ASSEMBLY TO EXCAVATING EQUIPMENT

This application is a divisional of co-pending application Ser. No. 13/705,691, filed Dec. 5, 2012, which is a divisional of application Ser. No. 13/369,699 filed Feb. 9, 2012, which is a divisional of application Ser. No. 13/005,791, filed Jan. 13, 2011, now U.S. Pat. No. 8,122,621, which is a divisional of application Ser. No. 11/729,502 filed Mar. 28, 2007, now U.S. Pat. No. 7,882,649, which is a non-provisional application which claims the benefit of provisional patent application Ser. No. 60/787,268, filed Mar. 30, 2006.

FIELD OF THE INVENTION

The present invention pertains to a wear assembly for securing a wear member to excavating equipment.

BACKGROUND OF THE INVENTION

Wear parts are commonly attached to excavating equipment, such as excavating buckets or cutterheads, to protect the equipment from wear and to enhance the digging operation. The wear parts may include excavating teeth, shrouds, etc. Such wear parts typically include a base, a wear member, and a lock to releasably hold the wear member to the base.

In regard to excavating teeth, the base includes a forwardly projecting nose for supporting the wear member. The base may be formed as an integral part of the digging edge or may be formed as one or more adapters that are fixed to the digging edge by welding or mechanical attachment. The wear member is a point which fits over the nose. The point narrows to a front digging edge for penetrating and breaking up the ground. The assembled nose and point cooperatively define an opening into which the lock is received to releasably hold the point to the nose.

Such wear members are commonly subjected to harsh conditions and heavy loading. Accordingly, the wear members wear out over a period of time and need to be replaced. Many designs have been developed in an effort to enhance the strength, stability, durability, penetration, safety, and/or ease of replacement of such wear members with varying degrees of success.

SUMMARY OF THE INVENTION

The present invention pertains to an improved wear assembly for securing wear members to excavating equipment for enhanced stability, strength, durability, penetration, safety, and ease of replacement.

In one aspect of the invention, the nose and socket are each provided with offset upper and lower stabilizing surfaces to provide a stable but streamlined design that provides higher strength, better penetration, and an improved flow of material into the excavator as compared to conventional teeth.

In another aspect of the invention, front and rear stabilizing surfaces of the nose and socket are each inclined to resist loads on the wear member with vertical components (herein called vertical loads) and side components (herein called side loads). In addition, shifting loads can be better resisted by such inclined surfaces with less relative motion between the nose and the socket for greater stability and less wear. In one preferred construction, the nose and socket have V-shaped rear stabilizing surfaces and inverted V-shaped front stabilizing surfaces.

In one other aspect of the invention, stabilizing shoulders formed integrally with the body of the wear member bear against complementary supports on the nose to increase stability and strength of the assembly. The shoulders are substantially parallel to the longitudinal axis of the nose to form a highly stable formation that resists vertically applied loads on the wear member. Unlike ears that project rearward from the body of the wear member, the shoulders are backed by the body of the wear member for additional strength. The use of shoulders also requires less metal than ears.

In another aspect of the invention, the nose and socket each includes a first faceted shape at the front end that transitions into a second increased-faceted shape and preferably, also into a third increased-faceted shape at the rear ends. In one preferred example, the front ends of the nose and socket are each formed generally as a triangle that transitions into a hexagonal shape, which, in turn, transitions into an octagonal shape at the rear end. The use of such shape changing formations enables the use of a slender wear assembly for good penetration while maintaining high strength characteristics and side stability.

In another aspect of the invention, the body of the nose and complementary main portion of the socket each includes upper and lower portions. Each of the upper and lower portions have a central facet and a pair of side facets that each extend out an inclination to the corresponding central facets. To achieve the desired stabilization, strength and slimmer profile, the upper and lower portions are asymmetrical such that the upper central facet has an expanding width in a rearward direction, wherein the lower central facet has a narrowing width in a rearward direction.

In another aspect of the invention, the front ends of the nose and socket are each formed with sidewalls that are inclined inward in the upward direction to minimize the lateral projection of the upper corners. The use of such inclined sidewalls at the front ends reduces the outer profile of the assembly for better penetration of the ground. By moving the upper corners inward, the risk of break through (i.e., the formation of holes passing into the socket) is also reduced, thus, lengthening the useable life of the wear member. The use of inclined stabilizing surfaces along the sidewalls further reduces wear as vertical and side loads are both resisted by the same surfaces.

In one preferred embodiment, the nose and socket each includes a generally triangular-shaped front stabilizing end. In one example, the triangular stabilizing end is formed by a generally horizontal lower surface and an inverted V-shaped upper surface. As discussed above, this construction enhances penetration, increases the useable life of the wear member by minimizing the risk of break-through and resists both side and vertical loads with the same surfaces.

In a further aspect of the invention, the nose includes an upper converging wall and a lower converging wall to have the common wedge shape as a compromise of strength and penetration. However, as opposed to prior constructions, the upper wall continues converging toward the lower wall through the front end for enhanced penetration while continuing to provide the desired stabilization.

In one other aspect of the invention, the lock is integrally secured to the wear member for shipping and storage as a single integral component. The lock is maintained within the lock opening irrespective of the insertion of the nose into the cavity, which results in less shipping costs, reduced storage needs, and less inventory concerns.

In another aspect of the invention, the lock is releasably securable in the lock opening in the wear member in both hold and release positions to reduce the risk of dropping or losing the lock during installation. Such an assembly involves fewer independent components and an easier installation procedure.

In a further aspect of the invention, the lock and wear member can be maintained as a single integral component through shipping, storage, installation and use through an easily movable system without reliance on threaded members. This arrangement enables improved part management and easier installation of the wear member with less risk of losing the lock.

In another aspect of the invention, the lock is swung about an axis that extends generally longitudinally for easy use and stability. In the hold position, the lock fits within a cavity defined in a sidewall of the nose, which avoids the conventional through-hole and provides increased nose strength. Moreover, the sides of the lock form a secure and stable locking arrangement without substantial loading of the hinge or latch portions of the lock. In addition, the lock is operable without a hammer for ease of use and enhanced safety.

In another aspect of the invention, the lock is formed with a pivot support and a biasing member to permit not only pivotal movement of the lock between hold and release positions, but also a shifting movement to permit latching in the hold position and/or release positions. In one preferred embodiment of the invention, the lock body defines at least one pry slot whereby a pry tool can securely engage the lock to shift and pivot the lock for easy installation and removal.

In another aspect of the invention, the lock is provided with a latch formation which includes a centrally positional formation to be used to release the lock from the lock position.

BRIEF DESCRIPTION OF THE DRAWINGS

FIG. 2 is a side view of the wear assembly.
FIG. 3 is a cross-sectional view of the wear assembly vertically taken along the longitudinal axis.
FIG. 4 is an upper perspective view of a base of the wear assembly.
FIG. 5 is a lower perspective view of the nose of the base.
FIG. 6 is a top view of the nose.
FIG. 7 is a side view of the base.
FIG. 10 is a cross-sectional view of the base taken along such section line 10-10 in FIG. 9.
FIG. 11 is a cross-sectional view of the base taken along such section line 11-11 in FIG. 8.

FIG. 31 is a perspective view of the wear member with the lock in the release position.
FIG. 32 is an enlarged transverse cross-sectional view of the lock in the release position.
FIG. 33 is a perspective view of a second embodiment of a wear assembly in accordance with the present invention.

DETAILED DESCRIPTION OF THE PREFERRED EMBODIMENTS

Figure 1:
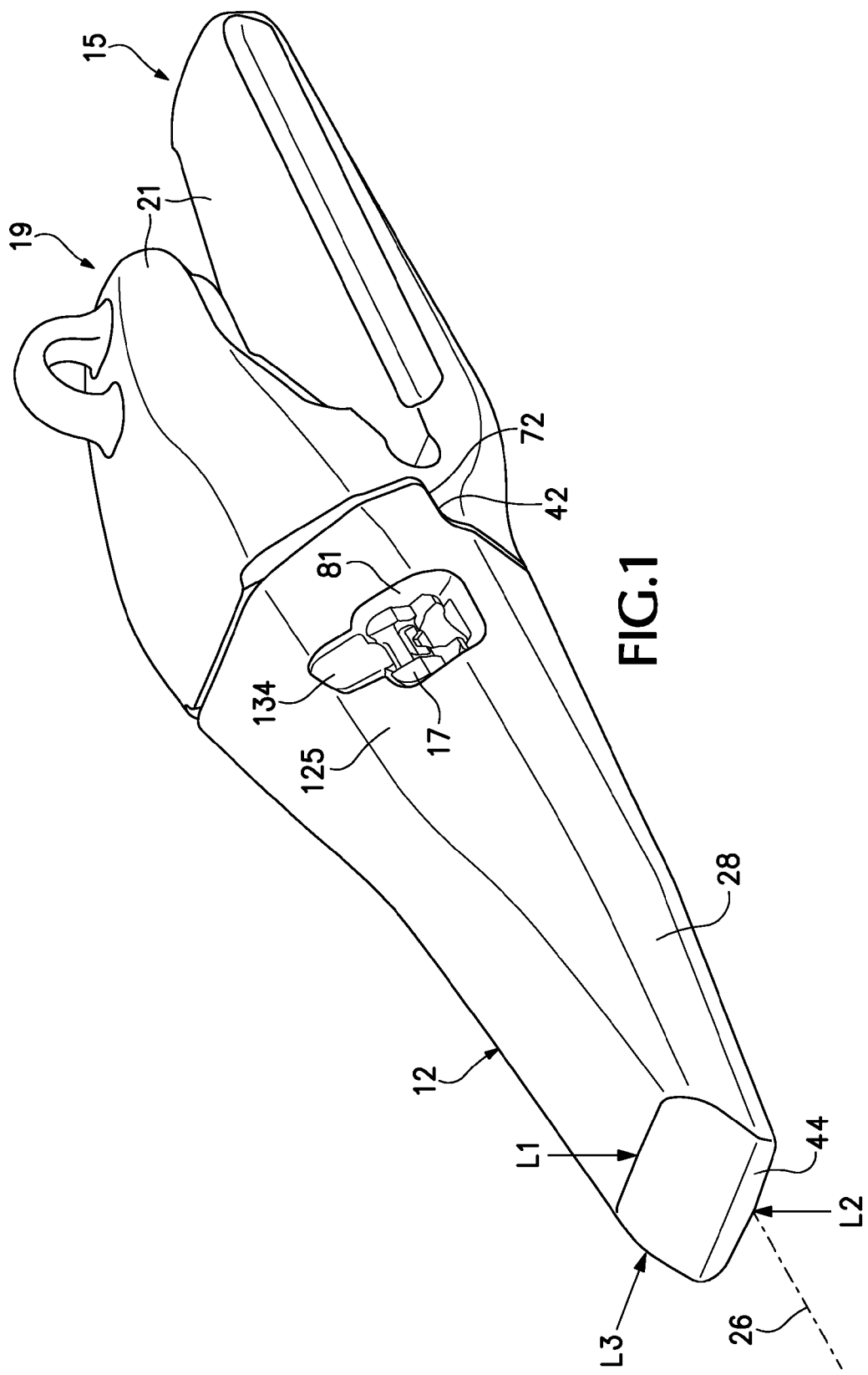
FIG. 1 is a perspective view of a wear assembly in accordance with the present invention.
Figure 8:
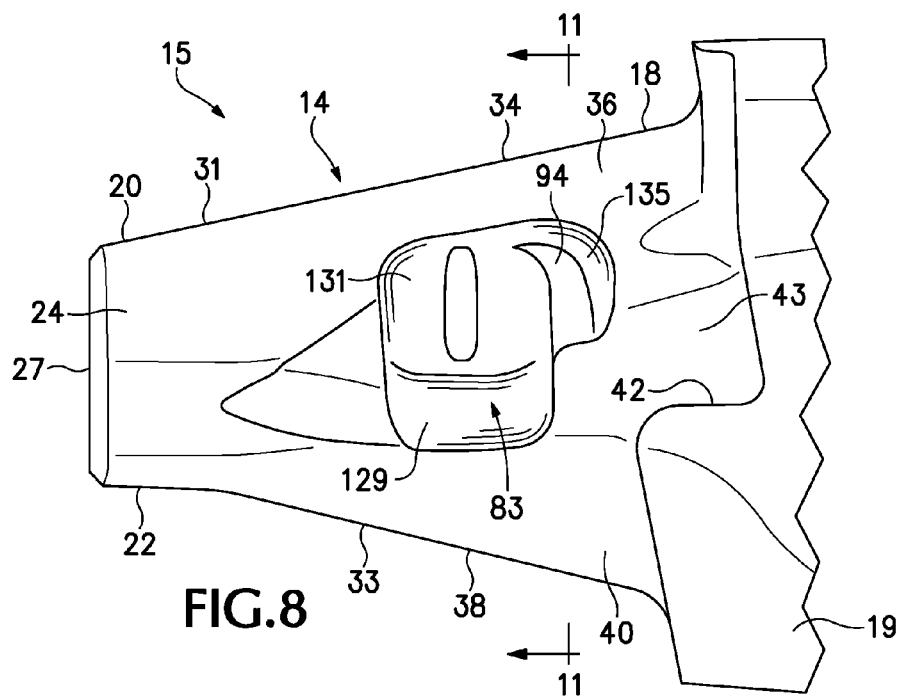
FIG. 8 is a side view of the nose.

The present invention pertains to a wear assembly 10 for releasably attaching a wear member 12 to excavating equipment (not shown). In this application, wear member 12 is described in terms of a point for an excavating tooth that is attached to a lip of an excavating bucket. However, the wear member could be in the form of other kinds of wear parts (e.g., shrouds) or attached to other excavating equipment (e.g., dredge cutterheads). Moreover, relative terms such as forward, rearward, up, down, horizontal or vertical are used for convenience of explanation with reference to the orientation of the assembly in FIG. 1; other orientations are possible.

In one embodiment (FIGS. 1-32), the wear member or point 12 is adapted to fit on a nose 14. The nose is the front portion of a base 15 that is fixed to a bucket (not shown) or other equipment. The rear mounting portion 19 of base 15 can be fixed to the bucket in a number of common ways. In the illustrated example, base 15 includes a pair of rearward legs 21 (FIGS. 1-3) that extend over and are welded to the lip of a bucket. Nevertheless, the base can include only one leg, be cast as part of the lip, or be mechanically fixed to the bucket lip, such as by a Whisler-style lock. When the base is secured to the lip by welding or a locking mechanism, the base is typically called an adapter. The base can also consist of a plurality of interconnected adapters. Wear member 12 is releasably secured to nose 14 by a lock 17.

Nose 14 includes a body 18 and a front end 20 (FIGS. 3-11). The front end 20 preferably has a generally triangular shape with a horizontal lower surface 22 and a pair of inclined surfaces 24 facing upward and outward, collectively defining an inverted V-shape. The lower and upper surfaces 22, 24 are front stabilizing surfaces that are substantially parallel to the longitudinal axis 26 of the nose. The term "substantially parallel" is intended to include parallel surfaces as well as surfaces that diverge rearwardly from axis 26 at a small angle (e.g., of about 1-7 degrees) for manufacturing or other purposes. A small divergence may also ease removal of the wear member from the nose. In one preferred embodiment, each stabilizing surface 22, 24 diverges rearwardly at an angle of no more than about 5 degrees and most preferably about 2-3 degrees to axis 26.

It is common in digging operations for the teeth to be forced forward and upward through the ground. As a result, the primary directions in which excavating teeth are commonly loaded are rearward and downward. Front face 27 of nose 14 abuts front surface 29 in socket 16 to primarily resist rearward loads. Upper stabilizing surfaces 24 are substantially parallel to axis 26 to provide stable resistance to downwardly applied vertical loads on the front end of wear member 12. Also, due to irregularities in the ground, rocks, and other impediments, the teeth also tend to experience side loads as well as loads that shift. Upper stabilizing surfaces 24 are inclined to resist both downward vertical loads and side loads. Loads that shift between vertical and side loads are also better resisted by the same upper surfaces 24 to reduce shifting of wear member 12 on nose 14, and thereby reduce wearing of the components. The larger surface area provided by both angled upper surfaces 24 as compared to lower surface 22 can also provide a benefit in resisting the expected larger downward loads.

Figure 9:
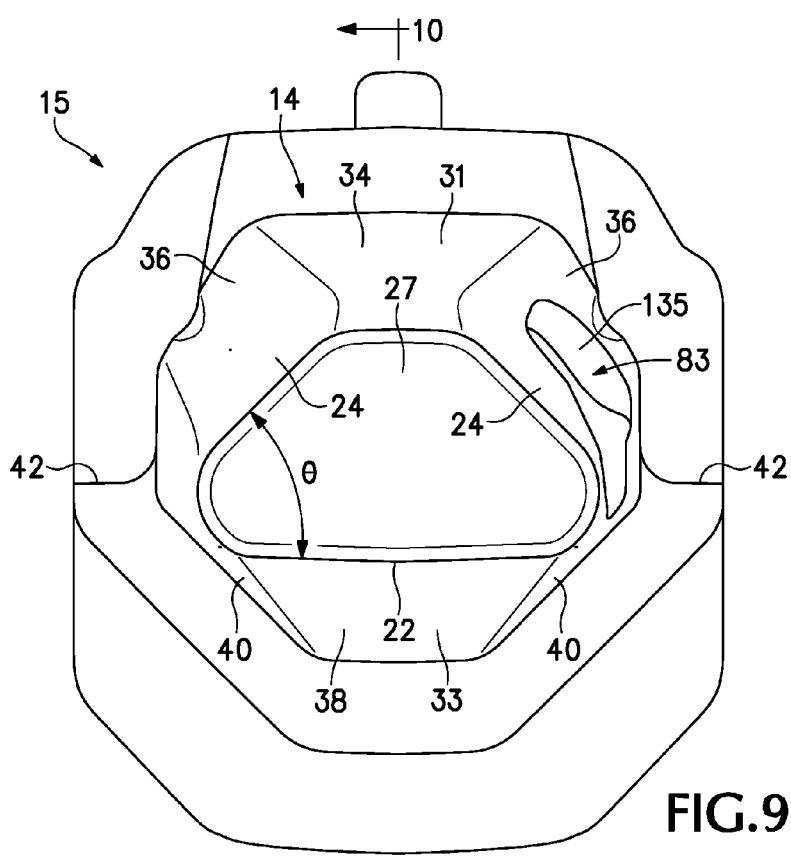
FIG. 9 is a front view of the base.
Figure 12:
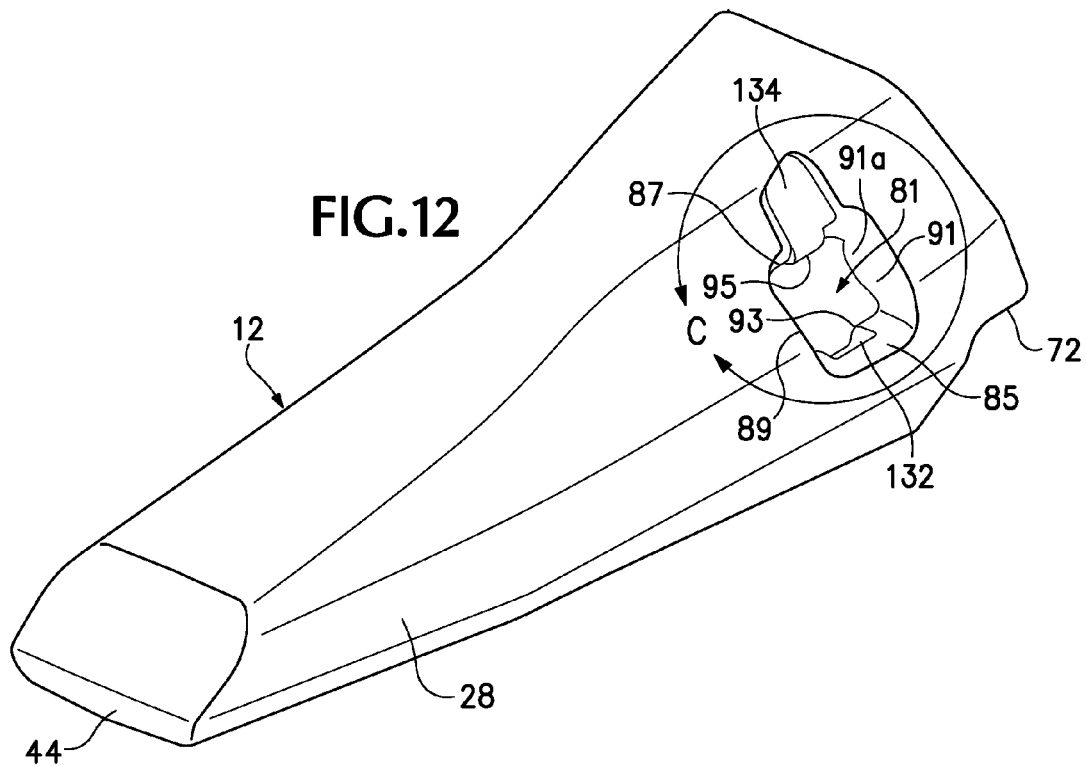
FIG. 12 is a perspective view of a wear member of the wear assembly.
Figure 13:
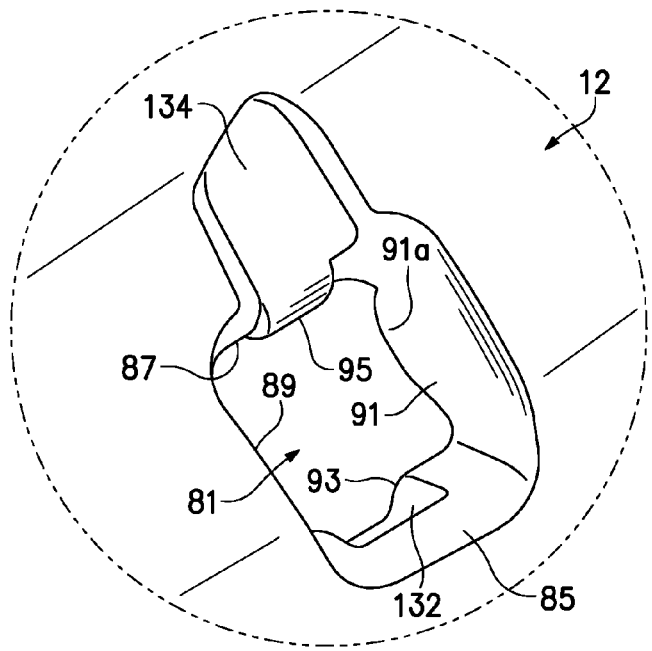
FIG. 13 is an enlarged view of the part of the wear member within the circle c in FIG. 12.

Since vertical loading is typically greater than side loading, upper surfaces 24 are preferably more horizontal than vertical, i.e., at an angle $\theta$ between 0 and 45 degrees relative to lower surface 22, and most preferably at an angle $\theta$ of about 40 degrees (FIG. 9). Nevertheless, inclinations outside the preferred range are possible, particularly in light duty operations or in environments where high side loading can occur. Lower surface 22 is provided to resist upward vertical loading.

A triangularly-shaped front end (along with other parts of the nose) also ensures that wear member 12 will be mounted properly on the nose, i.e., the wear member cannot be mounted the wrong way on the nose. Moreover, since the wear member is not subject to reversible mounting, the nose and socket can be formed to optimize shape for a given application. As example, the nose may be formed with a profile for greater penetration, a shape that reduces the rate of wear on the wear member, and an efficient construction to specially suit loads and wear patterns expected in the desired digging operations.

In an effort to stabilize the mounting of the wear member, it has been known to form the front end of the nose and socket as mating parallelepipeds with rectangular shaped stabilizing surfaces. At times, the wear member can thin causing high stress which may lead to failure or wear through the wear member to expose the nose at the corners, which in either case results in the wear member needing to be replaced before the bit portion 28 has worn away. Since downward loading is typically greater than upward loading and with the flow of earthen material into the bucket, such break through usually occurs along the top of the wear member. With an upward-pointing, triangularly-shaped front stabilizing end for nose 14, upper surfaces 24 are inclined downwardly, in a lateral direction, to shift the upper front corners of the stabilization end to a central position (FIGS. 4, 5 and 9). This reduced profile at its lateral ends, in turn, reduces the wearing and stress on the upper lateral ends of the socket and nose compared to conventional teeth. As a result, the usable lives of the wear member and the nose are increased. In addition, the triangular front end 20 of nose 14 defines a smaller profile for better penetration into the ground. The use of inclined surfaces at the upper corners allows the wear member to be shaped such that more surface area is available to carry earthen materials into the bucket.

While front stabilizing end 20 preferably has a triangular shape formed by upper and lower surfaces 22, 24, other configurations with inclined side surfaces can be used to reduce the lateral projection of the upper front corners. In such a construction, the inclined sidewalls may define a generally trapezoidal shape. As another example, the upper corners may be chamfered to shift the upper corners inward. The chamfers may be made so as to eliminate the sidewalls and/or top walls or to connect the side and top walls. In another example, although planar surfaces are preferred, the inclined surfaces may be curved to define, for example, a generally hemispherically shaped front end.

Moreover, a triangular shaped front end 20 or other front end shapes with inclined sidewalls could be used in connection with other known nose configurations. As an example only, such a front end could be used as a stabilizing front end instead of the stabilizing front end disclosed on the nose in U.S. Pat. No. 5,709,043. In addition, the front end could be reversed for digging operations where the loads and wear would be expected to be along the bottom side as opposed to the top side of the wear assembly.

Nose 14 is further defined in part by an upper wall 31 and a lower wall 33 (FIGS. 3 and 10). Upper and lower walls 31, 33 converge toward front thrust surface 27 to form the common wedge shape to provide a compromise of strength and the ability to penetrate. However, unlike the common nose formed with front stabilizing surfaces, the central portion 34 of upper wall 31 continues to converge toward lower wall 33 through front end 20 to the thrust surface 27 for a slimmer outer profile and enhanced penetration without sacrificing stability. This continued tapering of upper wall 31 through front end 20 and the accompanying slimming of the nose is possible because of the use of the inclined stabilizing surfaces 24 to provide the stabilizing support.

As discussed above, upper wall 31 and a lower wall 33 that are each inclined to diverge away from axis 26 in a rearward direction. To reduce obstructions and enhance flow of earthen material into the bucket, upper wall 31 has a more shallow inclination relative to axis 26 than lower wall 33. Further, nose 14 transitions rearwardly from a relatively small sized front end 20 with facets 22, 24 for high penetration and stability into a larger sized rear end with increased facets for strength and support (FIGS. 3-11). In the illustrated embodiment, the nose changes from a generally triangular front end into a six-faceted body, which in turn transitions into an eight-faceted body at its rear end.

In a preferred construction, nose 14 transitions from a three or four-faceted surface at the front end (depending on whether central facet 34 maintains a significant width in front end 20) into a six-faceted surface into body 18 for strength, stability and a slimmer profile. Body 18 preferably comprises an upper central facet 34 and a pair of inclined side facets 36, and a lower central facet 38 and inclined side facets 40 to present a strong profile. The use of central facets 34, 38 reduces the overall depth of the assembly to provide a more slender projection for better penetration. The top central facet 34 is preferably flat in a transverse direction with a width that expands rearwardly to ease the flow of earthen material into the bucket. The lower central facet 38 is also generally flat in a transverse direction, but preferably has a narrowing width in a rearward direction. This is particularly beneficial on account of the greater inclination of lower side 33 as compared to upper side 31. While planar facets 34, 36, 38, 40 are preferred, curved facets could also be used. Nevertheless, other shapes and arrangements where the nose changes from a relatively small sized front end with a certain facets into a larger sized rear end with increased facets are possible.

Lower side facets 40 are preferably substantially parallel to axis 26 to define rear stabilizing surfaces (FIGS. 5, 7, 8 and 9). As with front stabilizing surfaces 24, rear stabilizing surfaces 40 are laterally inclined to resist both vertical and side loading. The inclination of stabilizing surfaces 40 should be chosen as a balance between stabilizing the wear member under vertical loading and providing the assembly with sufficient overall strength. Accordingly, side facets 40 are preferably inclined relative to central facet 38 at an angle φ between 105 and 180 degrees, and most preferably at an angle of about 128 degrees (FIG. 11). Nevertheless, stabilizing surfaces 40 could be inclined outside of the preferred range, particularly in light duty operations or those involving high side loading. The rearward narrowing of central facet 38 also maximizes the rearward expansion of stabilizing surfaces 40 to provide greater surface area for resisting loads, particularly at the rear of nose 14.

In a preferred embodiment, body 25 transitions into an eight-faceted structure at its rear end 41 (FIGS. 4, 5, 7 and 8). In the illustrated example, nose 14 further includes a pair of opposite, vertically positioned side surfaces 43 to reduce the profile of the nose for better penetration and to provide additional support to resist side loads. The use of a nose and socket which transitions through three phases, each having more facets than the more forward phases (excluding surfaces pertaining to the lock or those of ridges and grooves), provides an advantageous combination of strength and slenderness for improved operation and penetration. In a preferred example, the first front phase includes four facets, the middle phase rearward of the front stabilizing end includes six facets, and the rear phase defines eight facets rearward of the lock (though it could extend forward of the lock if desired). Alternatively, if facet 34 does not extend through the front end 20, then the first phase would have three facets. In either case, the front end 20 is considered to be generally triangular.

Base 15 further includes supports 42 adjacent nose 14 for additional stabilization of wear member 12 under upwardly directed loads (FIGS. 4-9). In a preferred construction, supports 42 are substantially parallel to axis 26 and oriented generally in a horizontal orientation, though they could be laterally inclined to resist both vertical and side loads. One support 42 sets to each side of nose 14 just below the intersection of facets 36, 40, although they could be at or just above the intersection. In this preferred construction, upper stabilizing surfaces 42 are laterally offset from lower stabilizing surfaces 40. This offset, juxtaposed relationship of the lower and upper stabilizing surfaces 40, 42 on base 15 enables the use of a more slender tooth system than if upper facets 36 were designed to be stabilizing surfaces that, for example, mirror lower facets 40. Since supports 42 provide stabilization against upward loads, upper facets 36 are inclined in both axial and lateral directions, without defining stabilization surfaces substantially parallel to axis 26. With this construction, side facets 36 avoid extending farther upward and impeding the flow of earthen material into the bucket. Nevertheless, facets 36 could be formed as stabilizing surfaces with or without supports 42, or other arrangements of stabilizing surfaces could be used. Moreover, since supports 42 are preferably structured to resist only vertical loading, a single support on one side could be provided if desired.

Figure 14:
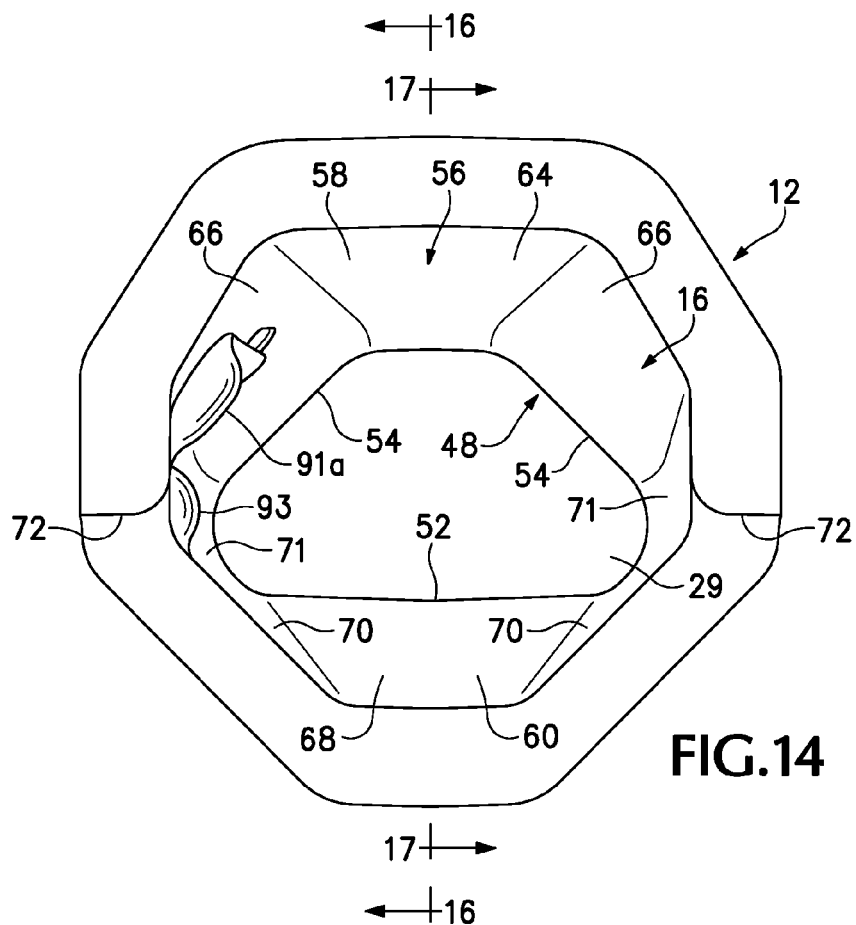
FIG. 14 is a rear view of the wear member.
Figure 15:
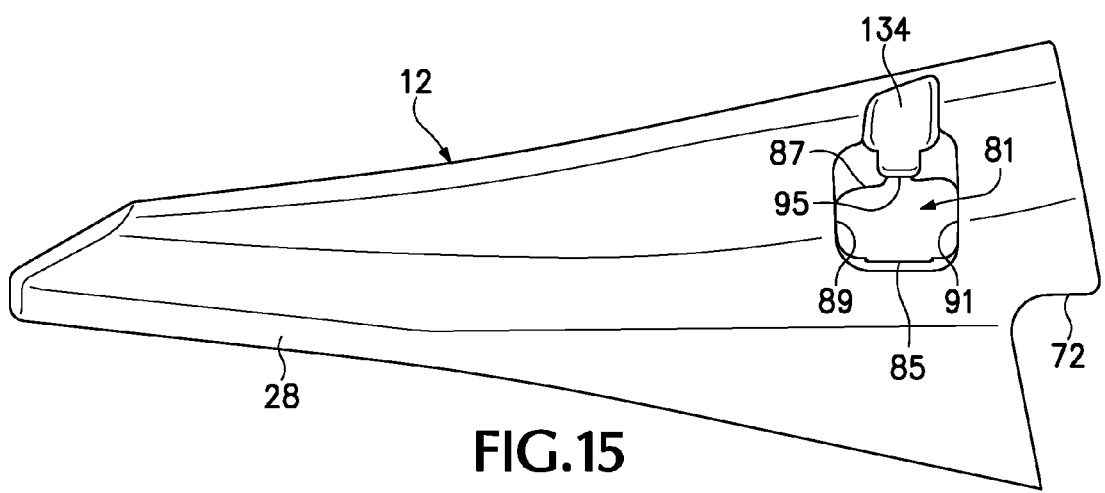
FIG. 15 is a side view of the wear member.

Wear member 12 includes a bit 28 with a front digging edge 44 and a mounting end 46 with a rearwardly-opening socket 16 (FIGS. 1-3 and 12-17). Socket 16 is preferably formed to matingly receive nose 14, although differences between the nose and socket could exist. Accordingly, socket 16 preferably includes a generally triangular-shaped stabilizing front end 48 having a lower stabilizing surface 52 and a pair of upper stabilizing surfaces 54 (FIG. 14). Stabilizing surfaces 52, 54 are substantially parallel to axis 26. As with nose 14, socket 16 transitions into a larger main portion 56 defined by an upper side 58 and a lower side 60. Upper side 58 includes a top facet 64 and side facets 66 to correspond to facets 34, 36 on nose 14. Likewise, lower side 60 includes a bottom facet 68 and side facets 70 to correspond to facets 38, 40 on nose 14. Side facets 70 are also substantially parallel to longitudinal axis 26 to bear against side facets 40 under certain loads. Side surfaces 71 are also provided to bear against side surfaces 43.

Mounting end 46 further includes shoulders 72 formed by an offset portion 74 of upper side 58 that overhangs past the rear end of lower side 60 (FIGS. 1, 2, 12 and 14-17). Shoulders 72 are substantially parallel to axis 26 and oriented generally horizontal to bear against supports 42. Shoulders 72 are integral with upper side 58 rather than extending rearwardly like known cantilevered ears. This arrangement, then, as compared to cantilevered ears, provides shoulders 72 with greater support and requires the use of less metal. Nevertheless, it is possible to provide ears to bear against supports 42.

While any portion of the nose may at times bear loads from the wear member, stabilizing surfaces 22, 24, 40, 42, 52, 54, 70, 72 are intended to be the primary surfaces for resisting vertical and side loads that are applied to the wear member. When loads having vertical components are applied along the digging edge 44 of wear member 12, the wear member is urged to roll forward off the nose. For example, when a downward load L1 is applied to the top of digging edge 44 (FIG. 1), wear member 12 is urged to roll forward on nose 14 such that front stabilizing surfaces 54 in socket 16 bear against stabilizing surfaces 24 at the front end of nose 14. The rear end 79 of lower side 60 of wear member 12 is also drawn upward against the lower side 33 of nose 14 such that rear stabilizing surfaces 70 in socket 16 bear against stabilizing surfaces 40 of nose 14.

The engagement of stabilizing surfaces 40, 70 provides more stable support for the point as compared to the use of conventional converging surfaces, with less reliance on the lock. For instance, if load L1 is applied to a tooth with a nose and socket defined by converging top and bottom walls without stabilizing surfaces 40, 70, the urge to roll the wear member off the nose is resisted in part by the abutting of converging walls at the rear ends of the nose and socket. Since these converging walls are axially inclined to the longitudinal axis, their abutment with each other urges the point in a forward direction, which must be resisted by the lock. Accordingly, in such known constructions, a larger lock is needed to hold the point to the nose. A larger lock, in turn, requires larger openings in the nose and point, thus, reducing the overall strength of the assembly. In the present invention, stabilizing surfaces 40, 70 (in conjunction with stabilizing surfaces 24, 54) are substantially parallel to longitudinal axis 26 to minimize forward urging of wear member 12. As a result, the wear member is stably supported on the nose to increase the strength and stability of the assembly, reduce wear, and enable the use of smaller locks.

Stabilizing surfaces 22, 42, 52, 72 function in essentially the same manner for upwardly-directed vertical loads. An upwardly directed load L2 (FIG. 1) causes front stabilizing surface 52 of socket 16 to bear against stabilizing surface 22 on the front end of nose 14. The upward rolling of wear member 12 on nose 14 is also resisted by shoulders 72 bearing against supports 42 at the rear ends of wear member 12 and nose 14. These stabilizing surfaces 22, 42, 52, 72 can have a smaller surface than stabilizing surfaces 40, 70 because the bulk of the loads are expected to be rearward and downward.

As noted above, in the illustrated embodiment, stabilizing surfaces 24, 40, 54, 70 are inclined in transverse directions. Preferably, these angled stabilizing surfaces are symmetrical, although an asymmetrical arrangement is possible. The transverse inclination of stabilizing surfaces 24, 40, 54, 70 enables them to resist side loads, such as load L3 (FIG. 1). For example, the application of side load L3 causes wear member 12 to laterally cant on nose 14. The front stabilizing surface 54 on the side L3 is applied is pushed laterally inward to bear against front stabilizing surface 24 on nose 14. The rear portion 79 of facet 70 on the opposite sidewall of socket 16 is drawn inward to bear against the corresponding facet 40. The opposite stabilizing surfaces 24, 54, 40, 70 work in the same way for oppositely directed side loads.

It is advantageous for the same surfaces to resist both vertical and side loading. Loads are commonly applied in shifting directions as the bucket or other excavator is forced through the ground. With the laterally inclined surfaces, the bearing engagement continues between the same surfaces even if a load shifts, for example, from more of a vertical load to more of a side load. With this arrangement, movement of the point and wearing of the components can be reduced. Stabilizing surfaces 22, 42, 52, 72 are not inclined in the preferred embodiment because the bulk of the loads are expected to be rearward and downward, and the use of horizontal stabilizing surfaces in this direction enables the design of an assembly with less depth.

Stabilizing surfaces 22, 24, 40, 42, 52, 54, 70, 72 are preferably planar, but could have different shapes. For example, the stabilizing surfaces could be formed with broad convex or concave curves. In addition, rear stabilizing surfaces 40, 70 are generally most effective when located at or near the rear end of the nose and socket. Hence, in the illustrated embodiment, the front portions of stabilizing surfaces 40, 70 taper to a front point. Of course, the front portions could have other narrowing shapes, non-converging shapes, or be eliminated entirely. Further, bearing may occur on only one portion of any or all of the stabilizing surfaces.

In one construction, lock 17 fits into an opening in the form of through-hole 81 defined in wear member 12 and a pocket or cavity 83 defined in one side of nose 14 (FIGS. 1-2). Lock 17 is movable between a hold position (FIGS. 1, 2 and 30) where the lock 17 holds wear member 12 to nose 14, and a release position (FIGS. 31 and 32) where wear member 12 can be installed on or removed from nose 14.

Figure 16:
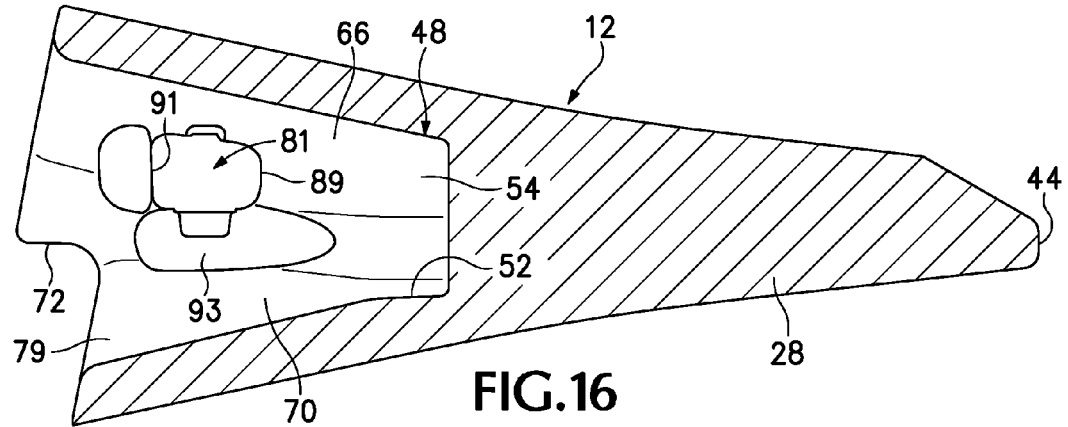
FIG. 16 is a cross-sectional view taken along section line 16-16 in FIG. 14.
Figure 17:
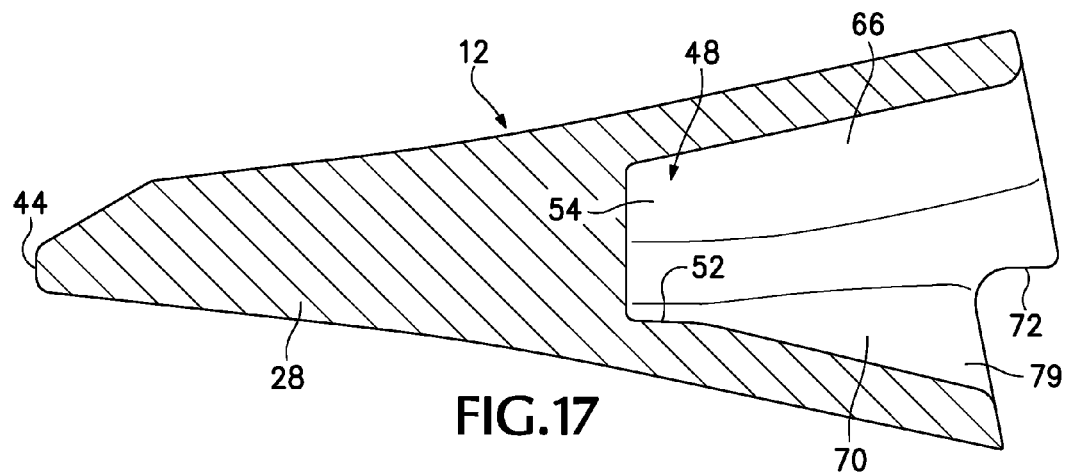
FIG. 17 is a cross-sectional view taken along section line 17-17 in FIG. 14.

Through-hole 81 preferably extends through a side facet 66 (FIGS. 1, 2 and 12-16), but could be formed in other parts of the wear member. Through-hole 81 has a generally rectangular shape with two end walls 85, 87, front wall 89 and rear wall 91, but could have other shapes. One end wall 85 defines a pivot member 93 in the form of a rounded bulb (FIG. 16). The bulb 93 is preferably turned inward, toward nose 14, to alleviate the risk of wearing the bulb away. Bulb 93 defines an axis that extends generally in a longitudinal direction relative to the wear assembly and is structured such that loading is minimized during use. The opposite end wall 87 defines a stop 95 in the form of a projection extending generally toward end wall 85. Rear wall 91 preferably includes an expanded portion 91a that extends into socket 16 to provide a larger bearing face for the lock and to move the bearing moment inward to reduce the tendency of the wear member 12 to cant on base 15 due to the lock securing only one side. Nose 14 includes recess 94 to accommodate the presence of the inward extension of rear wall 91.

Lock 17 (FIGS. 18-22) includes a narrow end 103, a wide end 105, a front face 107, and a rear face 109, though other shapes are possible. Narrow end 103 is formed as a pivot member 113, which preferably defines an arcuate recess to cooperate with bulb 93 on end wall 85 to enable the lock to pivotally swing between hold and release positions. Pivot members 93, 113 could be reversed so that the bulb is formed on lock 17 and the recess on wear member 12, or have a different construction that defines the pivot axis. Wide end 105 includes a latch formation 115 that cooperates with end wall 87 to retain lock 17 in hold and release positions. In addition, although pivot member 93 could be formed on end wall 87 and the latch formation 115 adapted to engage end wall 85, they are preferably as illustrated to minimize obstructions with adjacent wear assemblies during installation or release.

In the illustrated embodiment, lock 17 is composed of a body 110, a resilient member 112 and a shield 114 all bonded or otherwise secured together. Body 110 defines latch formation 115 that engages end wall 87 and stop 95. Shield 114 overlies resilient member 112 to engage bulb 93. Resilient member 112 provides lock 17 with a resilient compressibility.

Cavity 83 in nose 14 is preferably defined by base walls 129, 131 collectively having a generally L-shaped configuration, a front wall 133, and a rear wall 135 (FIGS. 4, 6, 7 and 8). Since cavity 83 does not extend through nose 14, it retains more of the nose strength. Base wall 129 provides a platform against which lock 17 can set to prevent excessive insertion. Base wall 131 is preferably curved to follow the arcuate path of lock 17 when swung into the hold position.

Figure 23:
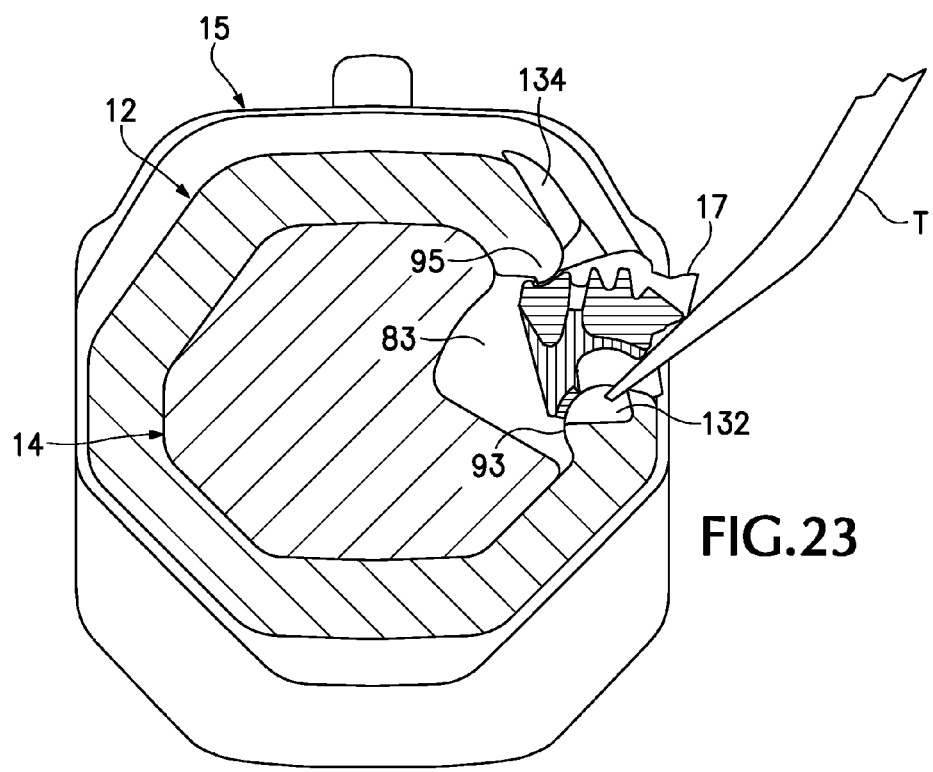
FIGS. 23-25 are transverse cross-section views showing the incremental installation of the lock into the wear assembly with a pry tool.
Figure 24:
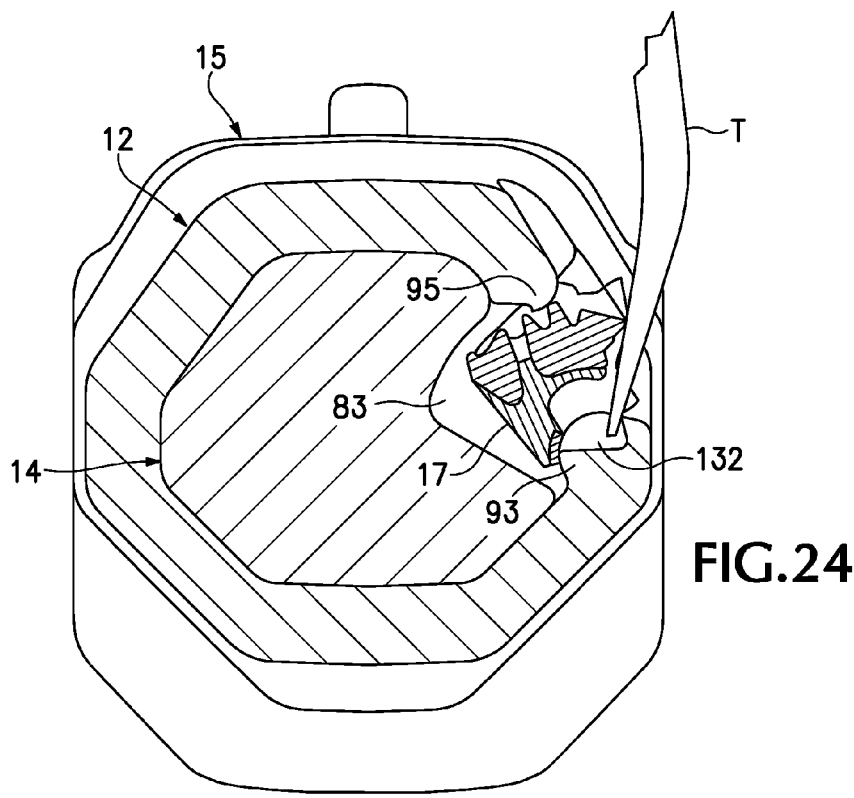
Figure 25:
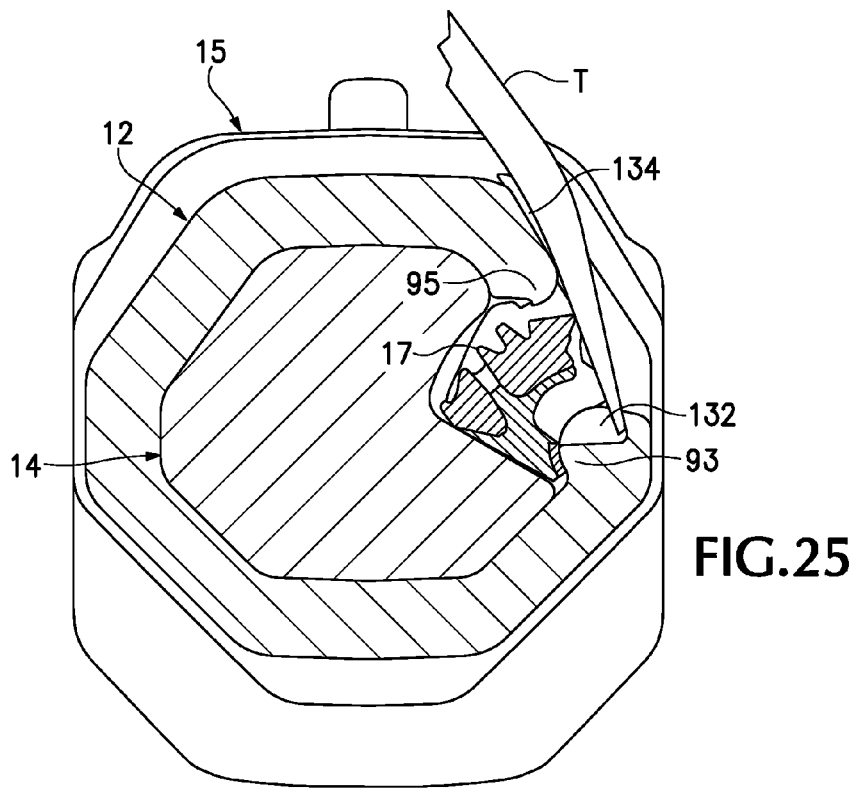
Figure 26:
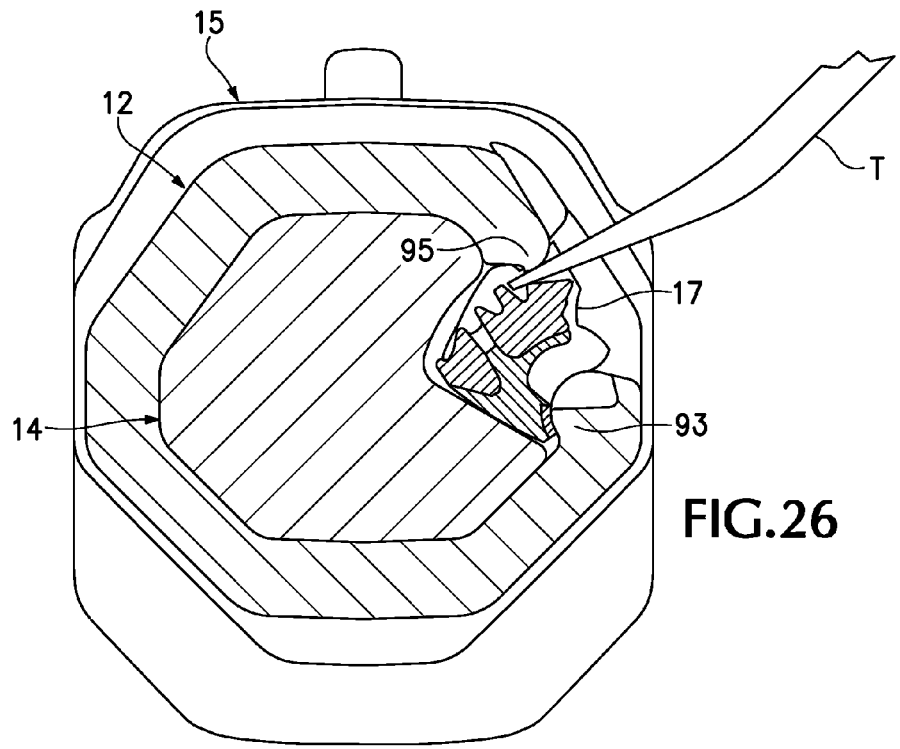
FIGS. 26-29 are transverse cross-sectional views showing the incremental removal of the lock from the wear assembly with a pry tool.
Figure 27:
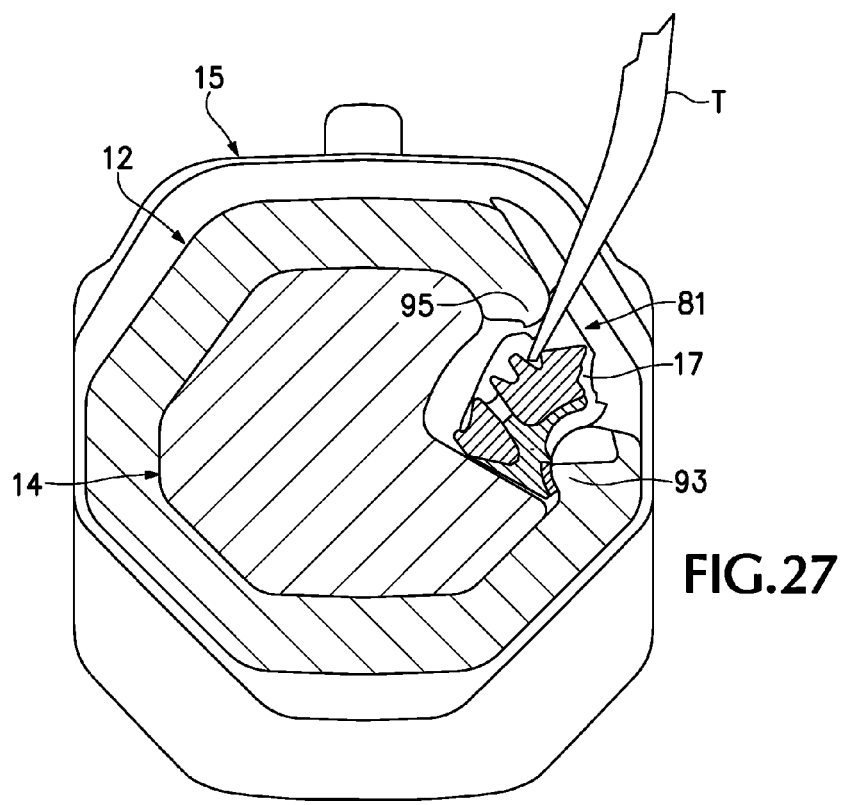

Lock 17 fits into through-hole 81 such that pivot member 113 bears against bulb 93 for pivotal movement of the lock between the hold position and the release position (FIGS. 23-32). To secure a wear member 12, lock 17 is swung about bulb 93 to fit fully within cavity 83. In the preferred embodiment, a tool T is used to move the lock into the hold position; i.e., tool T is placed into a slot 132 (FIGS. 12 and 13) in bulb 93 and used to pry lock 17 into the hold position (FIGS. 23-25). The tool is able to force fingers 116 past end wall 87 adjacent stop 95 with the compression of resilient member 112. In this position, fingers 116 opposes facet 66 in socket 16 to prevent movement of lock 17 away from the hold position. As a result, end wall 87 operates as catch for lock 17. A separate structure to operate as a catch could be used but is not necessary. While lock 17 preferably has two spaced apart fingers 116, a single finger 116 could be used. A recess 134 is preferably provided in outer surface 125 of wear member 12 to accommodate the desired movement of tool T. However, other prying arrangements could be used.

In the hold position, front face 107 of lock 17 opposes front wall 133 of cavity 83, and rear face 108 of lock 17 opposes rear wall 91 of through-hole 81. In this way, wear member 12 is securely held to base 15. In the illustrated embodiment, latch formation 115 includes fingers 116 that set behind facet 66 to prevent release of the lock from the assembly; resilient member 112 biases finger 116 behind facet 66 after insertion of lock 17 (although lock 17 is preferably not tight against end wall 87). In this position, the outer face 123 of lock 17 is generally aligned with or slightly recessed relative to the outer surface 125 of wear member 12

Figure 30:
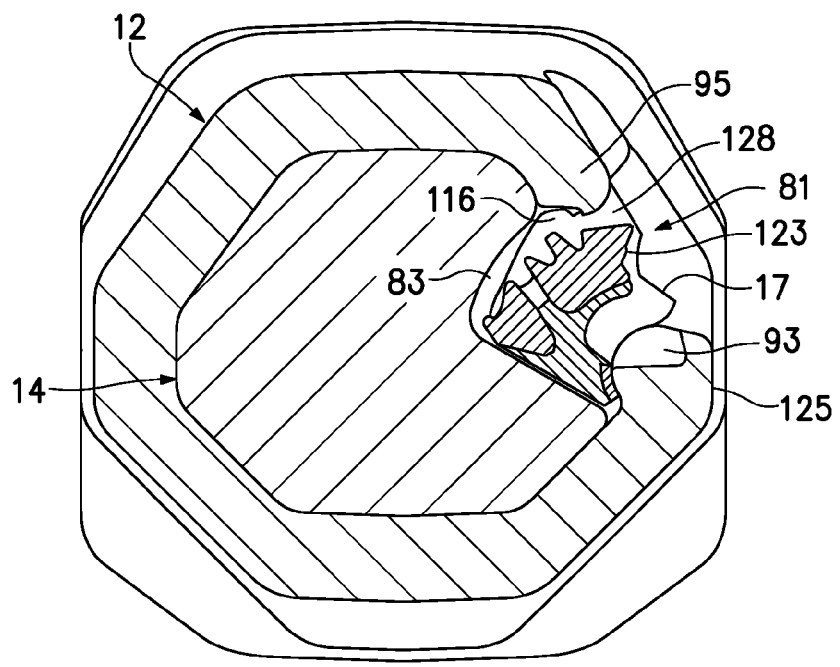
FIG. 30 is an enlarged, transverse cross-sectional view of the wear assembly with the lock in the hold position in the assembly.

(FIG. 30). In this way, the lock is partially protected from wearing and forms no obstruction to the flow of earthen material into the bucket.

Figure 30A:
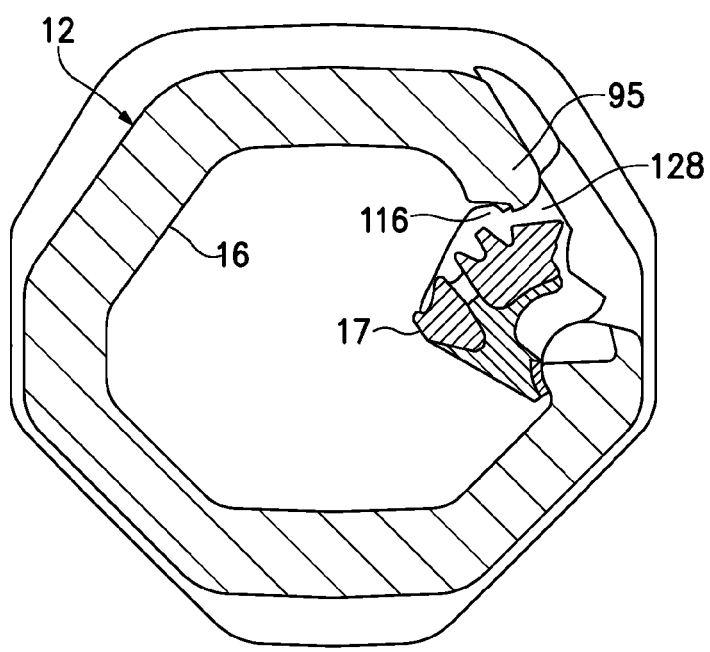
FIG. 30a is an enlarged, transverse cross-sectional view of the wear member combined with the lock in the hold position.

Lock 17 further includes a recess 120 along wide end 105. Notch 120 receives stop 95 to hold lock 17 in its release position (FIGS. 23, 31 and 32); resilient member 112 releasably holds the lock in this position. A protrusion 120a preferably extends outward at the distal end of recess 120 to prevent lock 17 from moving out of through-hole 81. In the preferred construction, lock 17 never needs to be removed from through-hole 81 in wear member 12. Lock 17 is installed into wear member 12 (in the release position) at the time of manufacture and shipped to a customer (FIG. 30a). The customer stores the wear member with the lock in it until needed for use. A depression 130 is preferably provided in nose 14 to accommodate passage of lock 17 in its release position during installation of the combined wear member and lock (FIGS. 4 and 7). A relief 130a is also preferable provided to permit passage of bulb 93 during installation of point. Then, the lock is swung to its hold position to secure wear member 12 to base 15 (FIG. 30). This arrangement reduces shipping and storage costs, virtually eliminates losing the locks in storage or at the installation site in the field, and eases the installation process. Nevertheless, lock 17 could be completely removed from wear member 12 if desired for shipping, storage, replacement, installation and/ or removal.

As noted above, lock 17 is placed in the hold position to secure wear member 12 to base 15. Lock 17 is preferably shipped and/or stored in combination with wear member 12 in the release position without base 15. Lock 17 could be structured to store and/or ship in the hold position or some rearward position if desired. Lock 17 preferably includes abutments 128 that prevent lock 17 from falling through through-hole 81 and into socket 16 when nose 14 is absent.

Figure 18:
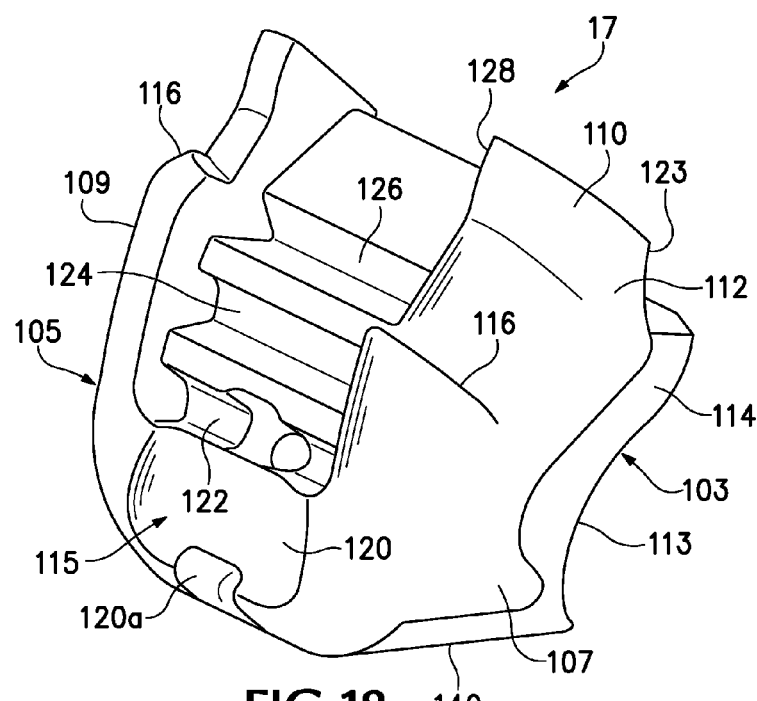
FIGS. 18 and 19 are each a perspective view of a lock for the wear assembly.
Figure 19:
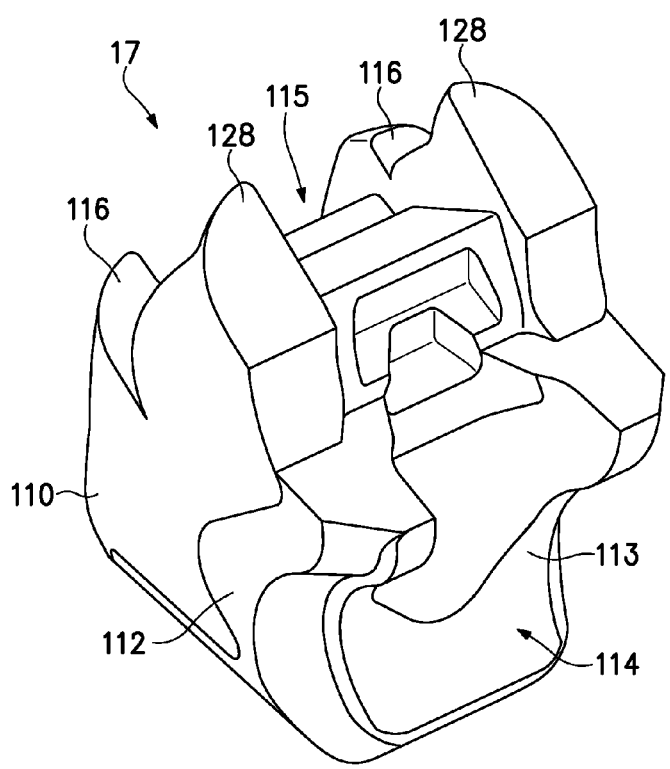
Figure 20:
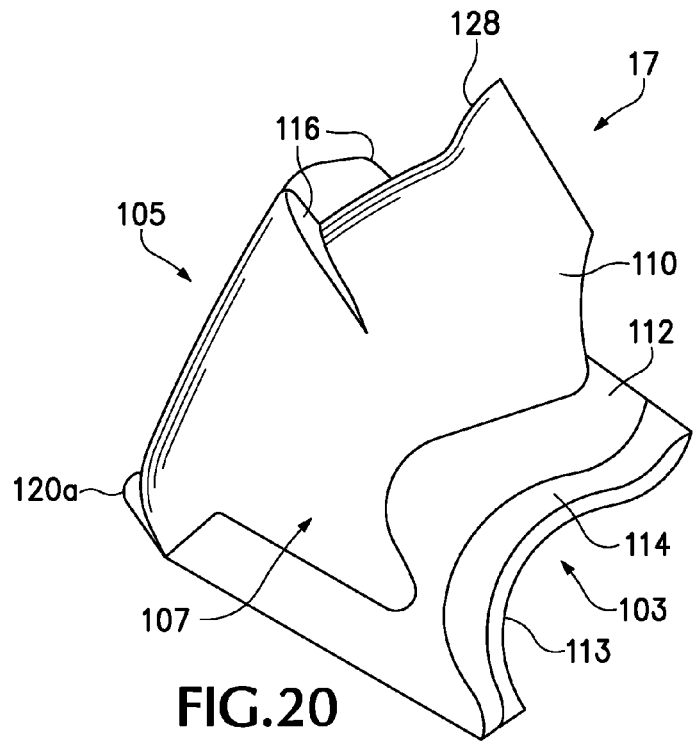
FIG. 20 is a front view of the lock.
Figure 21:
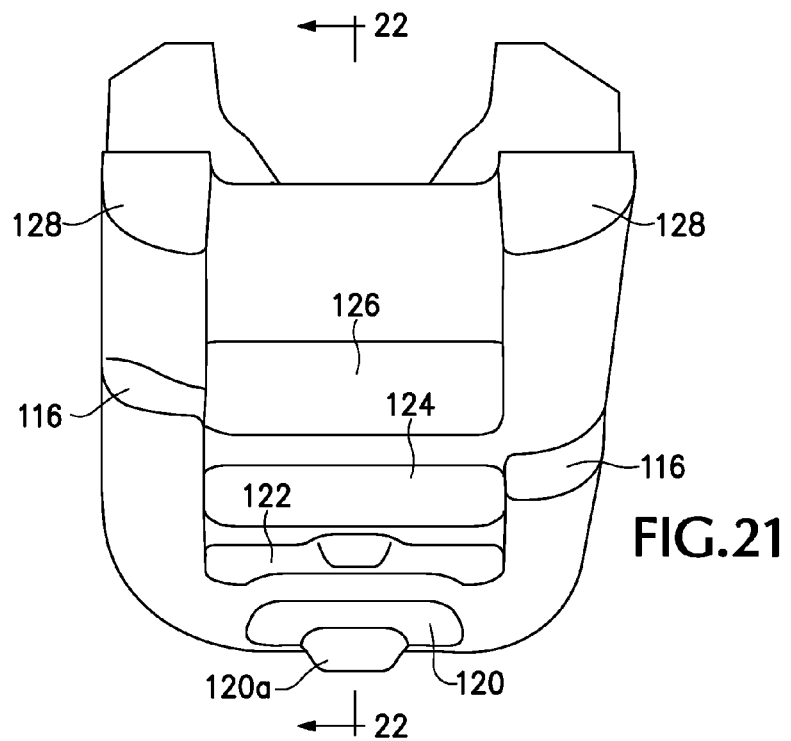
FIG. 21 is a side view of the lock.
Figure 22:
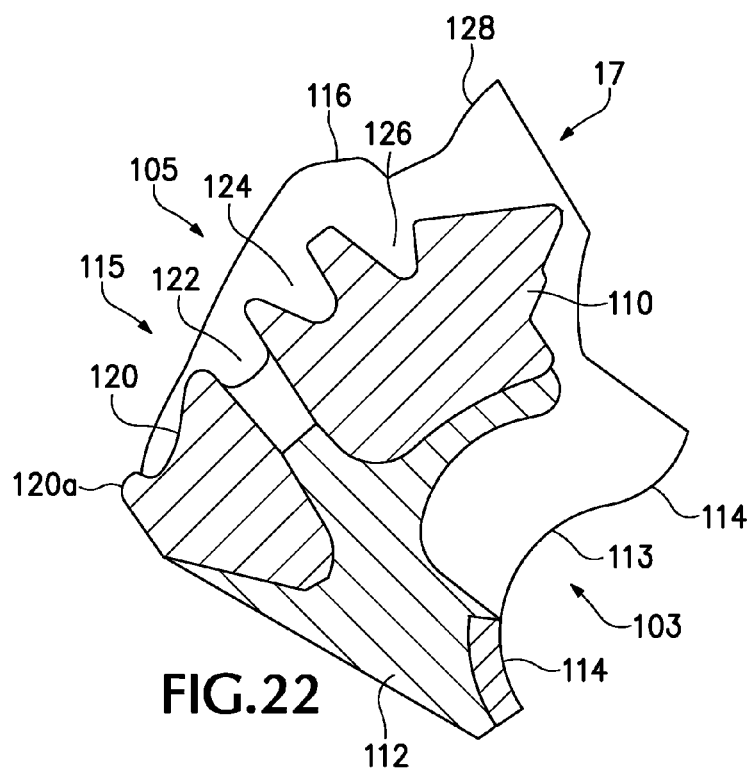
FIG. 22 is a cross-sectional view taken along line 22-22 in FIG. 21.
Figure 28:
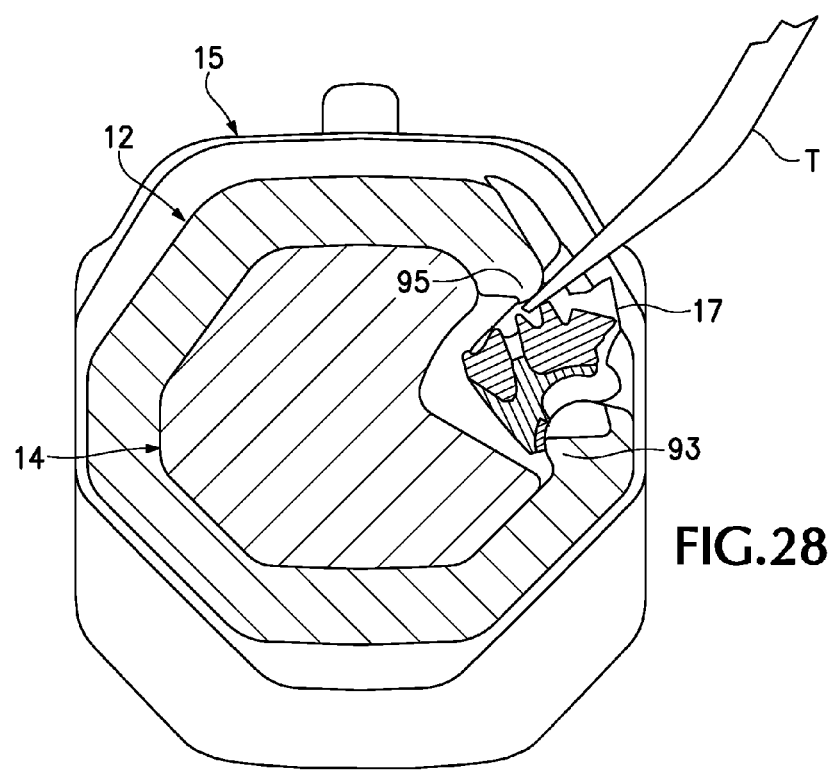
Figure 29:
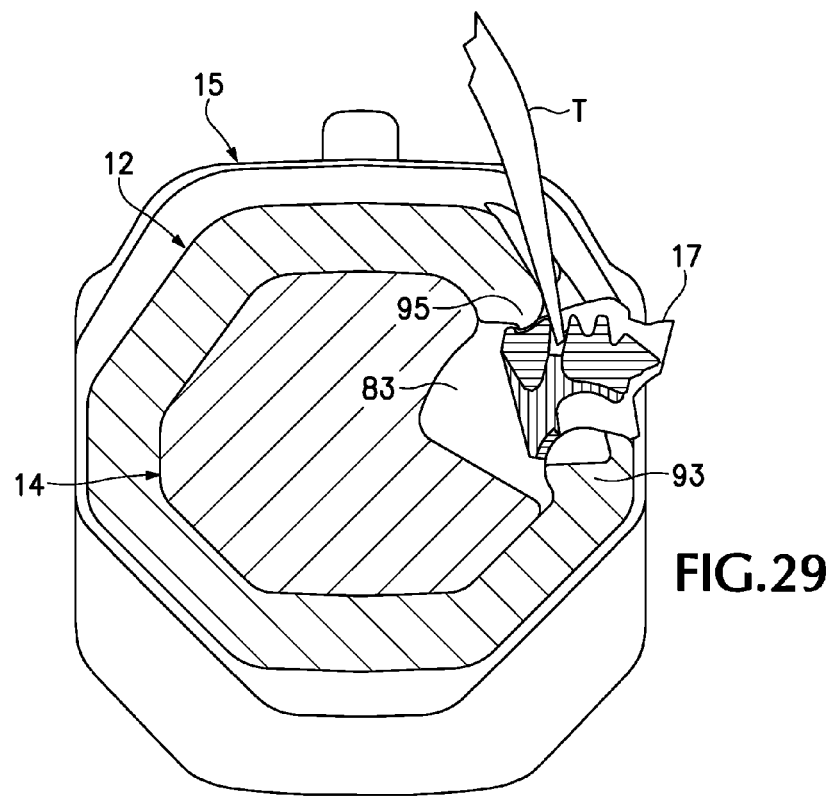

Lock 17 further includes notches 122, 124, 126 which are provided to aid removal of lock 17 from the assembly (FIGS. 18 and 22). Specifically, a tool T is used to engage notches 122, 124, 126 (FIGS. 26-29) as needed to pivot lock 17 from the hold position to the release position. For example, when releasing lock 17, the tool is initially placed in notch 126 (FIG. 26) and moved using stop 95 as a fulcrum to bias lock 17 toward bulb 93 against the bias of resilient member 112 (FIG. 27) and to swing lock 17 outward such that fingers 116 swing past end wall 87 and set outside of the through-hole 81 (FIG. 28). Then tool T is placed successively within notches 124 and 122 to swing lock 17 to the release position. The successive notches are for better leverage and ease of use.

In one construction, front and rear faces 107, 109 of lock 17 are generally parallel to the opposed front and rear walls 133, 135 of pocket 83. In this way, a firm engagement can be had between the lock and the pocket. Nevertheless, in an alternative construction, faces 107 and 109 of lock 17 converge toward inner side 149 to engage similarly converging walls 133, 135 of pocket 83. In this way, the lock can be more easily inserted and removed from pocket 83 as the walls do not engage until fully positioned.

In an alternative embodiment, wear assembly 210 is shown as a tooth for a ripper machine (FIGS. 33-37). The wear assembly includes a wear member 212 in the form of a point, a base 215 adapted to be fixed to a ripper arm, and a lock 217 to secure wear member 212 to base 215. Base 215 includes a nose 214 which is received in socket 216 in wear member 212. The configurations of nose 214 and socket 216 are generally the same as nose 14 and socket 16 discussed above in regard to wear assembly 10. Nevertheless, there can be some changes, as illustrated, such as the omission of the formations related to the locking arrangement and the omission of side surfaces 43, 71. There can also be relative changes to the dimensions of the various surfaces. Nose 214 and socket 216 each includes a generally triangular front end 220, which transitions rearwardly into a six-faceted structure. In the illustrated example, the nose and socket do not later transition into an eight-faceted structure as in wear assembly 10 (though it could if desired).

Figure 34:
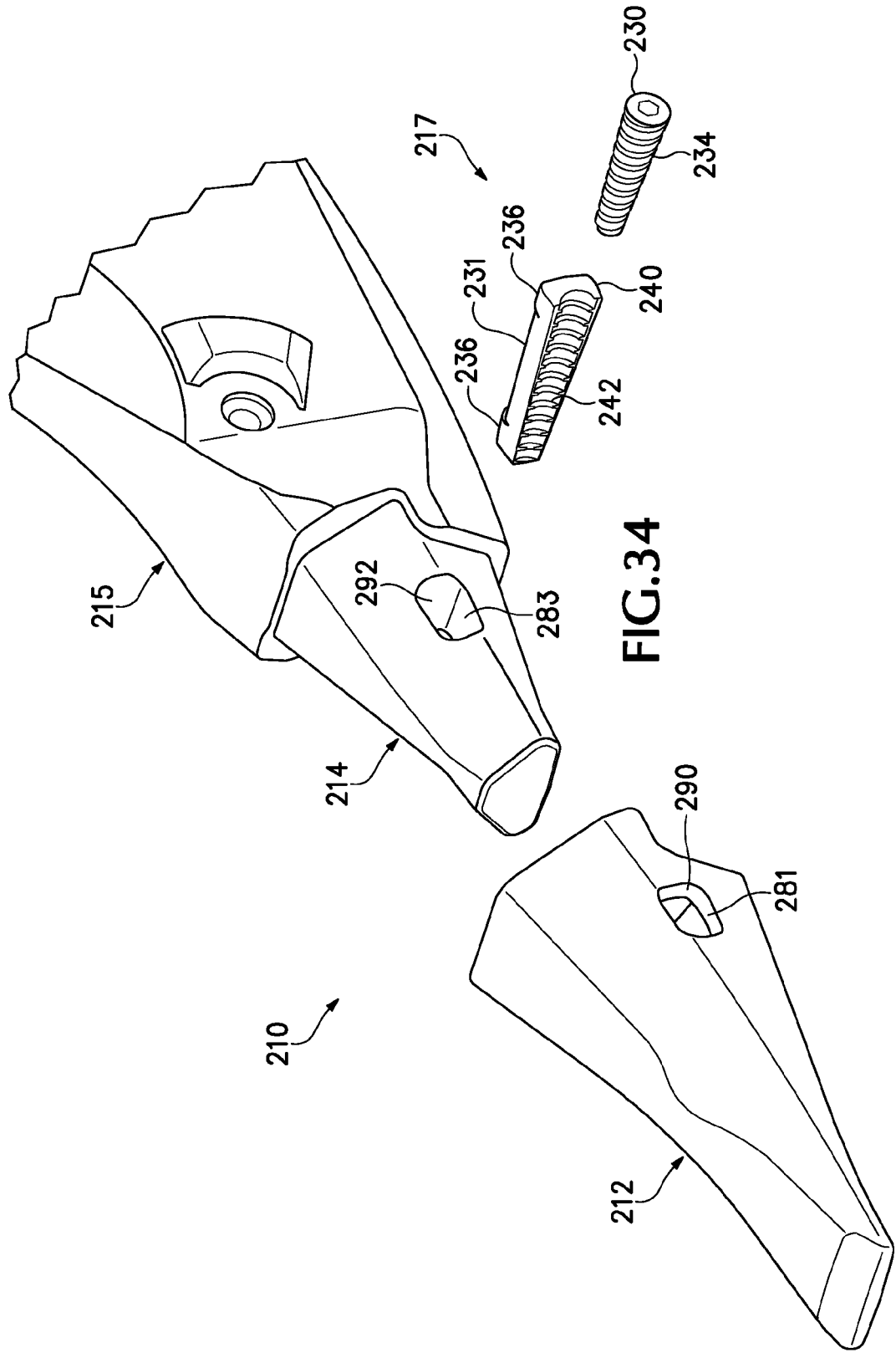
FIG. 34 is an exploded perspective view of the second embodiment.
Figure 35:
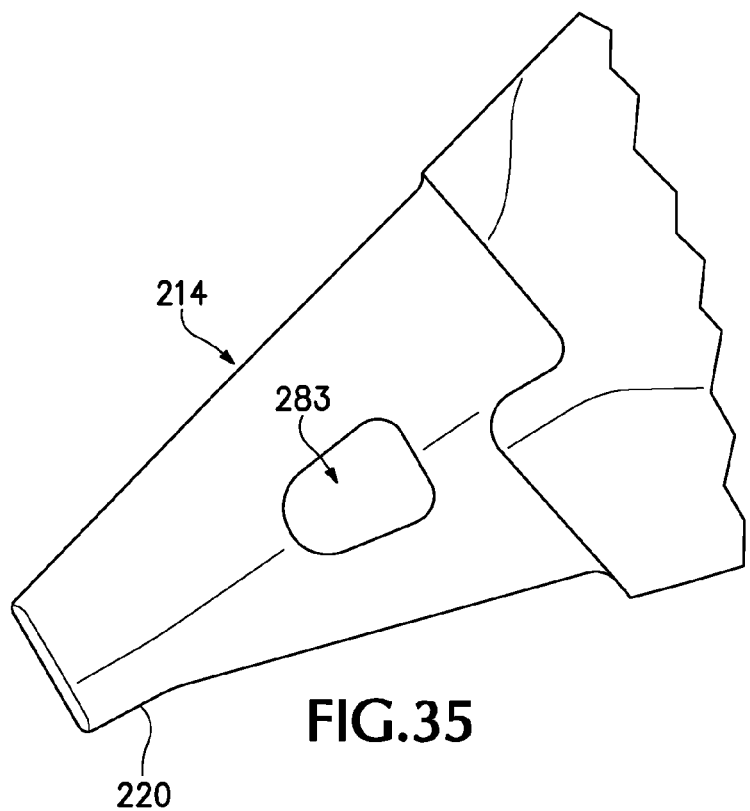
FIG. 35 is a side view of the nose of the second embodiment.
Figure 36:
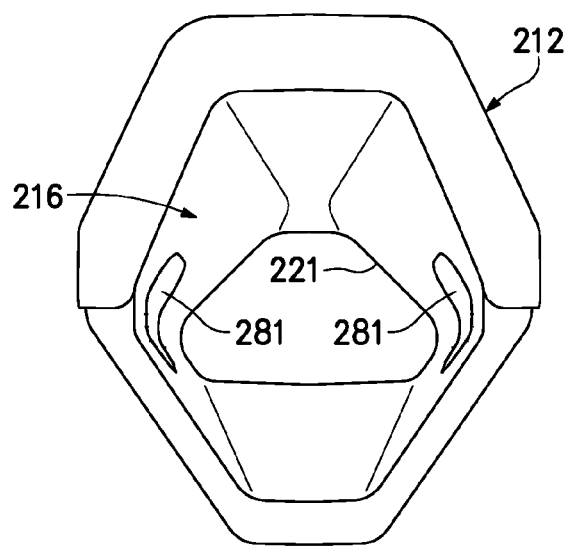
FIG. 36 is a rear view of the wear member of the second embodiment.
Figure 37:
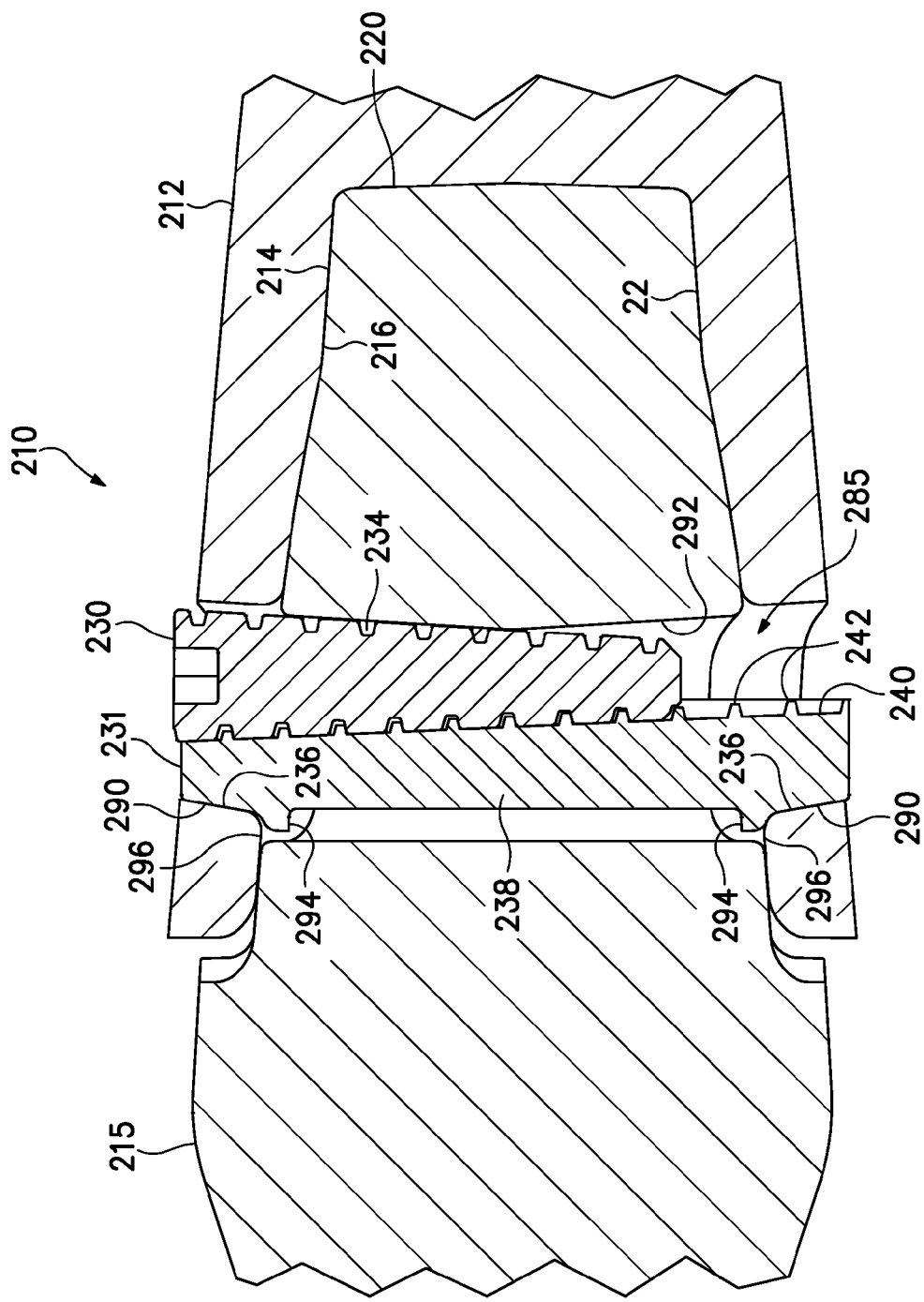
FIG. 37 is a partial cross-sectional view taken vertically along the longitudinal axis.

In assembly 210, lock 217 includes a wedge 230 and a spool 231 such as disclosed in U.S. Pat. No. 7,174,661, herein incorporated by reference. Wedge 230 has a conical shape and a thread formation in the form of a helical groove 234 (FIGS. 34 and 37). Spool 231 includes a pair of arms 236 and a body 238 interconnecting the arms. Body 238 defines a trough 240 in which is received wedge 230. Trough 240 includes spaced helical ridges 242 for receipt within groove 234. In this way, wedge 230 is threaded to spool 231 so that it can be drawn into the assembly by turning the wedge with a wrench or other tool.

Hole 283 extends horizontally through a mid-section of nose 214 to receive lock 217 (FIG. 33), but could extend vertically or diagonally. Wear member 212 defines a pair of through-holes 281 which generally align with hole 283 when nose 214 is fully received into socket 216 (FIGS. 33-37). Through-holes 281 and hole 283 collectively define an opening 285 to receive lock 217. Arms 236 abut against the rear ends 290 of through-holes 281 while wedge 230 bears against the front wall 292 of hole 283. Arms 236 each preferably includes a lip 294 to set within a relief 296 defined in wear member 212 to prevent inadvertent ejection of lock 217 during use (FIG. 37). As an alternative, lock 17 could be reversed such that the spool (without arms) engaged front wall 292 and the wedge engaged rear ends 290.

In use, wear member 212 is placed over nose 214 so that through-holes 281 generally align with hole 283 to collectively define opening 285. Lock 217 is placed into opening 285 with the arms 236 abutting against rear ends 290 of through-holes 281 and wedge 230 being loosely received into trough 240. Wedge 230 is rotated such that the receipt of ridges 242 in helical groove 234 pulls the wedge farther into opening 285 until the lock has firmly secured wear member 212 to base 215.

The above-discussions concern the preferred embodiments of the present invention. Various other embodiments may be used or other changes made without departing from the spirit and broader aspects of the invention as defined in the claims.

The invention claimed is:

1. A lock for attaching a wear member to a base fixed to excavating equipment, the lock comprising:
   a first end having a first latch formation for securing the lock in a hold position where the wear member is secured to the base and a second latch formation for securing the lock in a release position where the wear member can be released from the base; and
   a second end defining a pivot member that cooperates with a corresponding pivot member formed on the wear member for pivotal movement of the lock between the hold and release positions.

2. A lock in accordance with claim 1 further including a front wall and a rear wall extending between the first and second ends, the front wall being adapted to oppose a base wall and the rear wall being adapted to oppose a wear member wall to prevent release of the wear member from the base when the lock is in the hold position.

3. A lock for securing a wear member to a base fixed to excavating equipment, the lock comprising
a body and a resilient member coupled together for installation as a unit into a through-hole of the wear member,
the body including (i) a bearing surface to contact the base and hold the wear member to the base, (ii) an outer formation that permits the body to be moved about an axis in the through-hole, and (iii) a tool-engaging formation for moving the lock about the axis between a hold position where the bearing surface is positioned to contact the base to secure the wear member to the base, and a release position that is rotationally spaced about the axis from the hold position and where the bearing surface is free of contact with the base to permit removal of the wear member from the base, and
the resilient member having a flexibility that permits movement of the body between the hold and release positions and to retain the lock in each of the hold and release positions.

4. A lock in accordance with claim 3 wherein the lock is free of threads.

5. A lock in accordance with claim 3 wherein the lock includes stops that limit movement about the axis in the through-hole to less than a full rotation.

6. A lock in accordance with claim 3 wherein the lock includes abutments that prevent the lock from passing through the through-hole when moving from the release to the hold position.

7. A lock in accordance with claim 3 wherein the lock includes a narrow end and a wide end opposite the narrow end, such that when the lock is in the hold position the wide end generally faces into a socket of the wear member and the narrow end generally faces away from the socket.

8. A lock in accordance with claim 7 wherein the wide end includes a latch formation to retain the lock in each of the hold and release positions.

9. A lock in accordance with claim 8 wherein the latch formation includes at least one finger to prevent the lock from moving away from the hold position.

10. A lock in accordance with claim 8 wherein the latch formation includes a recess to prevent the lock from moving away from the release position.

11. A lock in accordance with claim 3 wherein the lock is recessed relative to an outer surface of the wear member when in the hold position.

12. A lock in accordance with claim 3 wherein the lock has a pivot support to engage a pivot member on the wear member to pivotally move the lock about the axis from the hold position to the release position.

* * * * *